(12) United States Patent
Minagata et al.

(10) Patent No.: US 10,658,643 B2
(45) Date of Patent: May 19, 2020

(54) ELECTRODE ASSEMBLY AND METHOD OF MANUFACTURING ELECTRODE ASSEMBLY

(71) Applicant: KABUSHIKI KAISHA TOYOTA JIDOSHOKKI, Kariya-shi, Aichi (JP)

(72) Inventors: Atsushi Minagata, Kariya (JP); Masato Ogasawara, Kariya (JP); Yasuyuki Goda, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 123 days.

(21) Appl. No.: 15/763,919

(22) PCT Filed: Oct. 29, 2015

(86) PCT No.: PCT/JP2015/080492
§ 371 (c)(1),
(2) Date: Mar. 28, 2018

(87) PCT Pub. No.: WO2017/072898
PCT Pub. Date: May 4, 2017

(65) Prior Publication Data
US 2018/0277816 A1 Sep. 27, 2018

(51) Int. Cl.
*H01M 2/18* (2006.01)
*H01M 2/16* (2006.01)
(Continued)

(52) U.S. Cl.
CPC .......... *H01M 2/18* (2013.01); *H01M 2/1673* (2013.01); *H01M 2/26* (2013.01); *H01M 4/139* (2013.01);
(Continued)

(58) Field of Classification Search
CPC ............ H01M 10/0404; H01M 10/05; H01M 10/0525; H01M 10/0585; H01M 2/1673; H01M 2/18; H01M 2/26; H01M 4/139
See application file for complete search history.

(56) References Cited

U.S. PATENT DOCUMENTS

2006/0269842 A1* 11/2006 Ichinose ............ H01M 2/0207
429/247
2010/0221607 A1 9/2010 Hatanaka et al.
(Continued)

FOREIGN PATENT DOCUMENTS

JP 09-120836 A 5/1997
JP 2005-174779 A 6/2005
(Continued)

OTHER PUBLICATIONS

International Search Report of PCT/JP2015/080492 dated Jan. 26, 2016 [PCT/ISA/210].

*Primary Examiner* — Carlos Barcena
(74) *Attorney, Agent, or Firm* — Sughrue Mion, PLLC

(57) ABSTRACT

A positive electrode plate includes a front positive electrode active material layer on a front surface of a positive electrode metal foil, and having a positive electrode large tapered portion that extends at an incline from one edge of the front surface of the positive electrode metal foil at a positive electrode large inclination angle. A negative electrode plate includes a front negative electrode active material layer on a front surface of a negative electrode metal foil, and having a negative electrode large tapered portion that extends at an incline from one edge of the front surface of the negative electrode metal foil at a negative electrode large inclination angle. The positive and negative electrode plates are alternately laminated with a separator interposed therebetween such that each of their front surfaces is oriented in
(Continued)

the same direction in the rear-to-front directional axis along the thickness of the plates.

10 Claims, 15 Drawing Sheets

(51) Int. Cl.
*H01M 2/26* (2006.01)
*H01M 4/139* (2010.01)
*H01M 10/04* (2006.01)
*H01M 10/0585* (2010.01)
*H01M 10/05* (2010.01)
*H01M 10/0525* (2010.01)

(52) U.S. Cl.
CPC ....... *H01M 10/0404* (2013.01); *H01M 10/05* (2013.01); *H01M 10/0585* (2013.01); *H01M 10/0525* (2013.01)

(56) References Cited

U.S. PATENT DOCUMENTS

| | | | |
|---|---|---|---|
| 2012/0058375 A1 | 3/2012 | Tanaka et al. | |
| 2012/0295158 A1* | 11/2012 | Tanaka | H01M 2/1673 429/211 |
| 2015/0244017 A1 | 8/2015 | Nishinaka et al. | |

FOREIGN PATENT DOCUMENTS

| | | |
|---|---|---|
| JP | 2008159539 A * | 7/2008 |
| JP | 2009-038016 A | 2/2009 |
| JP | 2009-283270 A | 12/2009 |
| JP | 2012-074359 A | 4/2012 |
| WO | 2014/034708 A1 | 3/2014 |

\* cited by examiner

ELECTRODE ASSEMBLY AND METHOD OF MANUFACTURING ELECTRODE ASSEMBLY

CROSS-REFERENCE TO RELATED APPLICATIONS

The present application is a National Phase entry of, and claims priority to, PCT Application No. PCT/JP2015/080492, filed Oct. 29, 2015, which is incorporated by reference herein in its entirety for all purposes.

BACKGROUND

This disclosure relates to an electrode assembly and a method for manufacturing said assembly.

According to Japanese Laid-Open Patent Publication No. 9-120836, describing a secondary battery, an electrode assembly and electrolyte solution are sealed in an inside of a case. The electrode assembly includes positive electrode plates and negative electrode plates that are stacked in an alternating manner wherein each of the positive electrode plates is enveloped by a separator. The electrolyte solution is filled in the case when a secondary battery is new. Accordingly, the electrolyte solution is filled around active material layers of the positive electrode plates and the negative electrode plates. Over time, the electrolyte solution is reduced with the use of the secondary battery due to electrolysis or evaporation. As a result, the active material layers of the positive electrode plates and the negative electrode plates are exposed from the electrolyte solution as the electrolyte solution is reduced. An electrolyte solution is built up around the exposed active material layers. The electrolyte solution immersed in the active material layers stays around the active material layers due to surface tension so as to form the built up electrolyte solution. The electrolyte solution immersed in the active material layers stays around the active material layers due to surface tension so as to form this electrolyte sump. The active material layers expand and contract while the secondary battery is charged and discharged. In accordance with this expansion and contraction, the electrolyte solution flows out and back between the active material layers and the built up electrolyte solution. The electrolyte solution is supplied to the active material layers as the electrolyte solution returned to the active material layers. The active material layers are impregnated with the electrolyte solution so as not to dry.

The Japanese Laid-Open Patent Publication No. 9-120836 does not disclose a specific structure for promoting the electrolyte solution to be supplied into each active material layer. It does not disclose a specific structure for suppressing uneven impregnation of electrolyte solution in a laminating direction of positive electrode plates and negative electrode plates. It does not disclose a specific structure for ensuring sufficient capacity for the active materials of each of the positive and negative electrode plates.

BRIEF SUMMARY

Exemplary embodiments of the present disclosure provide a structure for promoting electrolyte solution to be supplied to each active material layer in an electrode assembly in which positive electrode plates and negative electrode plates are stacked. Additionally, the present disclosure may provide a structure that suppresses uneven impregnation of electrolyte solution in a laminating direction of the positive electrode plates and negative electrode plates. Still further, the present disclosure may provide a structure for ensuring sufficient capacity for the active materials of each of the positive and negative electrode plates.

According to one aspect of the present disclosure, the electrode assembly includes positive electrode plates, negative electrode plates and separators. Each of the positive electrode plates includes a positive electrode metal foil, where a front positive electrode active material layer is provided on the front surface of the positive electrode metal foil and a rear positive electrode active material layer is provided on a rear surface of the positive electrode metal foil. Each of the negative electrode plates includes a negative electrode metal foil, where the front negative electrode active material layer is provided on a front surface of the negative electrode metal foil and a rear negative electrode active material layer provided on a rear surface of the negative electrode metal foil. Each of the separators is interposed between each of the positive electrode plates and each of the negative electrode plates. The front positive electrode active material layer of each positive electrode plate has a positive electrode large tapered portion that is inclined from one edge of the front surface of the positive electrode metal foil to an inner side of the positive electrode plate at a positive electrode large inclination angle. The rear positive electrode active material layer has a positive electrode small tapered portion that is inclined from one edge of the rear surface of the positive electrode metal foil to the inner side of the positive electrode plate at a positive electrode small inclination angle, where said angle is smaller than the positive electrode large inclination angle. The front negative electrode active material layer has a negative electrode large tapered portion that is inclined from one edge of the front surface of the negative electrode metal foil to the inner side of the negative electrode plate at a negative electrode large inclination angle. The rear negative electrode active material layer has a negative electrode small tapered portion that is inclined from one edge of the rear surface of the negative electrode metal foil to the inner side of the negative electrode plate at a negative electrode small inclination angle, where said angle is smaller than the negative electrode large inclination angle. Furthermore, in the electrode assembly, the positive electrode plates and the negative electrode plates are alternately laminated with the separator or separators interposed therebetween such that the front surface of the positive electrode plates having the positive electrode large tapered portion and the front surface of the negative electrode plates having the negative electrode large tapered portion are both oriented in the same direction on the rear-to-front directional axis along the thickness of the positive electrode plates and the negative electrode plates.

According to the above-described electrode assembly, the positive electrode large tapered portion and the negative electrode large tapered portion inclined to each inner side of the positive electrode plates and the negative electrode plates, respectively, are provided at each outer edge of the front positive electrode active material layer and the front negative electrode active material layer. Therefore, built up electrolyte is formed along each of the large tapered portions of the electrode assembly so as to be directed to the inner side of each of the respective positive electrode plates and negative electrode plates. Accordingly, in the electrode assembly, supply of the electrolyte solution to each inner side of the positive electrode plates and the negative electrode plates is promoted so that the impregnation efficiency of the electrolyte solution in the front positive electrode active material layer and the front negative electrode active material layer may be improved. As a result, with this electrode assembly, the supply of the electrolyte solution to the rear positive electrode active material layer and the rear negative electrode active material layer, which are opposed to each other with the separator between the front negative electrode active material layer and the front positive electrode active material layer, is also promoted such that the impregnation efficiency of the electrolyte solution to the rear positive electrode active material layer and the rear negative electrode active material layer may also be improved.

According to the electrode assembly described above, the positive electrode plates and the negative electrode plates are laminated with their front surfaces having the positive electrode large tapered portion or the negative electrode large tapered portion, respectively, oriented in the same direction. In the electrode assembly, such an orientation evenly distribute clearances into which the electrolyte solution enters as compared with the case where, for example, the positive electrode plates and the negative electrode plates are laminated such that their front surfaces and rear surfaces are laminated in random directions. As a result, with this electrode assembly, the uneven impregnation of the electrolyte solution in the laminating direction of the positive electrode plates and negative electrode plates may be prevented, whereas the evenly distributed supply of the electrolyte solution in each of the active material layers is promoted as described above. Further, with this structural configuration, the positive electrode plates and the negative electrode plates can also ensure sufficient capacity for the active materials by fixing the inclination angle of both the positive electrode small tapered portion and the negative electrode small tapered portion to be small.

According to another aspect of the present disclosure, one of the positive electrode plates or the negative electrode plates constitutes an electrode plate unit enveloped in a bag shape with the separator having a larger surface area than that of the one of the positive electrodes or negative electrode plates. The positive electrode large inclination angle is set to be smaller than the negative electrode large inclination angle when one of the positive electrode plates constitutes the electrode plate unit. Conversely, the negative electrode large inclination angle is set to be smaller than the positive electrode large inclination angle when one of the negative electrode plates constitutes the electrode plate unit.

In the above-described electrode plate unit, the separator covers the built-up electrolyte formed around the outer edge of the electrode plates from the outside in order to become a part of a plane which may retain the built-up electrolyte. In other words, the separator helps the formation of the built-up electrolyte. Therefore, with the structure of the electrode plate unit, the built-up electrolyte formed along the large tapered portion is stably retained as compared to the electrode plates in an exposed state (exposed electrode plates). Thus, with the retained built-up electrolyte it is possible to equalize an amount of the built-up electrolyte, which is formed at the respective large tapered portions of the electrode plate unit as well as the exposed electrode plates, by setting the inclination angle of the large tapered portion of the electrode plate of the electrode plate unit smaller than the inclination angle of the large tapered portion of the exposed electrode plates. Since these electrode units and exposed electrode plates are alternately laminated, the uneven impregnation of the electrolyte solution in the laminating direction can be prevented in the electrode assembly.

According to another aspect of the present disclosure, the separator is made as a one-piece construction. The surface area of the positive electrode metal foil is smaller than the surface area of the negative electrode metal foil. The positive electrode large inclination angle is set to be smaller than the negative electrode large inclination angle.

In the above-described electrode assembly, since the surface area of the positive electrode plate is smaller than the surface area of the negative electrode plate, the negative electrode plate projects from and is stacked on top of the positive electrode plate. This projecting part of the negative electrode plate becomes a part of a plane, which retains the built-up electrolyte formed around the outer edge of the positive electrode plate, to help the formation of the built-up electrolyte. Therefore, the built-up electrolyte formed along the large tapered portion of the positive electrode plate tends to be stably retained as compared with that of the negative electrode plate. Thus, it is possible to equalize an amount of the built-up electrolyte, which is formed at respective large tapered portions of the positive electrode plate and the negative electrode plate by setting the inclination angle of the large tapered portion of the positive electrode plate smaller than the inclination angle of the large tapered portion of the negative electrode plate. Since these positive electrode plates and negative electrode plates are alternately laminated, the uneven impregnation of the electrolyte solution in the laminating direction can be prevented in the electrode assembly.

According to another aspect of the present disclosure, each of the front negative electrode active material layer and the rear negative electrode active material layer is covered with a heat-resistant layer. The negative electrode large tapered portion extends from the front negative electrode active material layer to the heat-resistant layer. The front negative electrode active material layer is exposed at the negative electrode large tapered portion.

In the above electrode assembly, as described, both active material layers on the negative electrode plate are covered with a heat-resistant layer. In this configuration, the heat-resistant layer may effectively prevent short-circuiting between the positive electrode plate and negative electrode plate caused by, for example, high heat. With the negative electrode plate described above, the negative electrode large tapered portion extends up to the heat-resistant layer while the negative electrode large tapered portion exposes a part of the front negative electrode active material layer. This may promote the supply of the electrolyte solution from the built-up electrolyte, which is formed along the negative electrode large tapered portion, to the front negative electrode active material layer. Consequently, the impregnation speed of the electrolyte solution into the front negative electrode active material layer is accelerated.

Another aspect of the present disclosure relates to a method for manufacturing electrode assemblies including positive electrode plates, negative electrode plates and separators interposed between the positive electrode plates and negative electrode plates. According to this method for manufacturing the electrode assemblies, a positive electrode base sheet, having a front positive electrode active material layer and a rear positive electrode active material layer on each of the front and rear surfaces of a strip-shaped positive electrode metal foil, is prepared. Further, a negative electrode base sheet, having a front negative electrode active material layer and a rear negative electrode active material layer on each of the front and rear surfaces of a strip-shaped negative electrode metal foil, is prepared. Subsequently, a laser beam irradiates the positive electrode base sheet from the front positive electrode active material layer to the rear positive electrode active material layer in order to cut out the positive electrode plate from the positive electrode base sheet and in order to form a positive electrode large tapered portion which is inclined from one edge of a front surface of the positive electrode metal foil of the positive electrode plate to an inner side of the positive electrode plate at a positive electrode large inclination angle. The rear positive electrode active material layer is formed with a positive electrode small tapered portion that is inclined from one edge of a rear surface of the positive electrode metal foil of the positive electrode plate to an inner side of the positive electrode plate at a positive electrode small inclination angle smaller than the positive electrode large inclination angle. A laser beam irradiates the negative electrode base sheet from the front negative electrode active material layer to the rear negative electrode active material layer in order to cut out the negative electrode plate from the negative electrode base sheet and in order to form a negative electrode large tapered portion which is inclined from one edge of a front surface of the negative electrode metal foil of the negative electrode plate to an inner side of the negative electrode plate at a negative electrode large inclination angle. The rear negative electrode active material layer is formed with a negative electrode small tapered portion that is inclined from one edge of a rear surface of the negative electrode metal foil of the negative electrode plate to the inner side of the negative electrode plate at a negative electrode small inclination angle smaller than the negative electrode large inclination angle. After being cut out, the positive electrode plates and the negative electrode plates are laminated while the front surfaces of the positive electrode plates provided with the positive electrode large tapered portion and the front surfaces of the negative electrode plates provided with the negative electrode large tapered portion, respectively, are oriented in the same direction on the rear-to-front directional axis along the thickness of the positive electrode plate and negative electrode plate.

In the above method for manufacturing the electrode assemblies, the positive electrode large tapered portions and the negative electrode large tapered portions inclined to the inner side of the positive electrode plate and/or the negative electrode plate respectively are provided at each respective outer edge of the front positive electrode active material layer and the front negative electrode active material layer. Consequently, built-up electrolyte is formed in the electrode assembly as a final product along these large tapered portions to be directed to each inner side of the positive electrode plate and the negative electrode plate. This promotes supply of the electrolyte solution to each of the respective inner sides of the positive electrode plate and the negative electrode plate in the electrode assembly, to collectively improve the impregnation efficiency as a whole of the electrolyte solution in the front positive electrode active material layer and the front negative electrode active material layer. As a result, this electrode assembly also promotes the supply of the electrolyte solution to the rear negative electrode active material layer and the rear positive electrode active material layer, each of which respectively opposes the front positive electrode active material layer or the front negative electrode active material layer, with the separator interposed therebetween.

According to the above method for manufacturing the electrode assemblies, the positive electrode plate and the negative electrode plate are laminated with each of the front surfaces having the positive electrode large tapered portion and/or the negative electrode large tapered portion oriented in the same direction. In the electrode assembly, this evenly distributes clearances into which the electrolyte solution can enter as compared to the case where, for example, each of the front surfaces and rear surfaces of the positive electrode plates and the negative electrode plates, respectively, is laminated facing in random directions. As a result, uneven impregnation of the electrolyte solution in the laminating direction of the positive electrode plates and negative electrode plates may be prevented in the electrode assembly, while the evenly distributed supply of the electrolyte solution in each of the active material layers is promoted as described above. Furthermore, sufficient capacity of the active material can be ensured by setting the respective inclination angle of the positive electrode small tapered portion of the positive electrode plate and the negative electrode small tapered portion of the negative electrode plate to be small.

According to another aspect of the present disclosure, the laser beam is focused on a focal point at a predetermined position on the positive electrode base sheet or the negative electrode base sheet, and irradiates the respective base sheets such that an optical axis of the laser beam is perpendicular to the base sheet.

In the above method for manufacturing the electrode assemblies, the laser beam irradiates the base sheets such that it is perpendicular to each base sheet. In this way, large tapered portions having a symmetrical shape are formed on both sides of each base sheet across a cutting line formed by the laser beam. For example, when cutting out rectangular positive electrode plates in a continuously adjacent manner along a longitudinal direction of the positive electrode base sheet (see dotted lines in FIG. 10), the positive electrode large tapered portions each having a symmetrical shape can be formed on two sides of the cut-out positive electrode plates opposed to the longitudinal direction of the positive electrode base sheet such that the anisotropic arrangement of the positive electrode plates can be suppressed. In a similar manner, the anisotropic arrangement of the negative electrode plates may also be suppressed.

DETAILED DESCRIPTION

Figure 1:
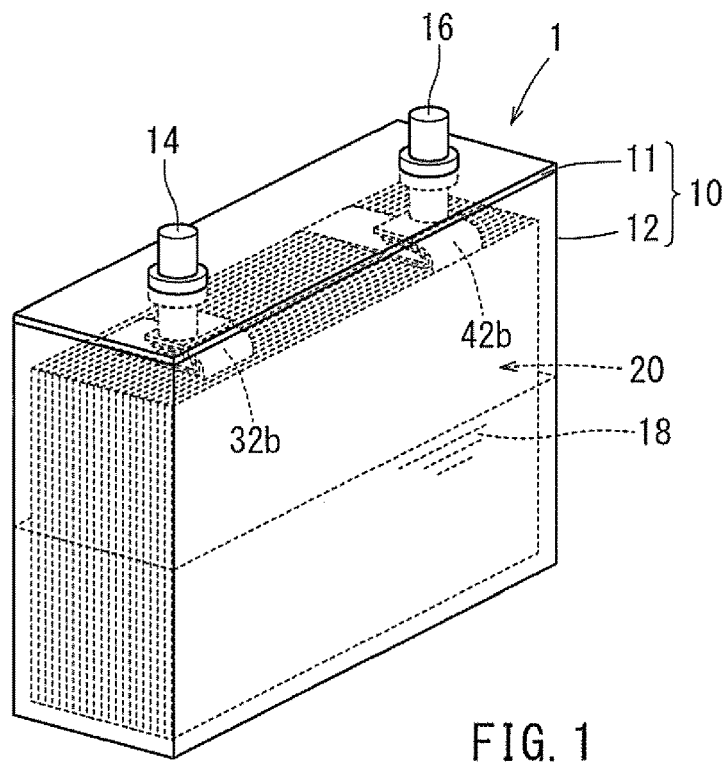
FIG. 1 is a perspective view of an electric storage device with an electrode assembly of the present disclosure.

One exemplary embodiment according to the present invention will be described with reference to the drawings. An electric storage device 1 shown in FIG. 1 is, for example, a lithium ion secondary battery. A case 10 of the electric storage device 1 includes a rectangular parallelepiped case main body 12 with a bottom and a flat lid 11 which covers a rectangular opening at the top of the case main body 12. The lid 11 includes external connection terminals 14 and 16. The external connection terminals 14 and 16 penetrate through the lid 11, and intersect with the lid 11 to form two circular planes, respectively. The circular planes formed by the intersection of the lid 11 with external connection terminals 14 and 16, respectively, are parallel to the directional axis along the thickness of the positive electrode plates and the negative electrode plates at the positive and negative electrode tabs 32b and 42b, respectively.

As shown in FIG. 1, the electric storage device 1 includes an electrode assembly 20 and electrolyte solution 18, both of which are stored inside of the case 10. The electrode assembly 20 is connected with the external connection terminals 14 and 16 via a positive electrode tab 32b and a negative electrode tab 42b, respectively, as described below. The electrode assembly 20 supplies electricity to the outside of the electric storage device 1 via the external connection terminals 14 and 16 (discharge) and is supplied with electricity from the outside of the electric storage device (recharge). As will be described below, the electrolyte solution 18 is filled in the case 10 when the electric storage device 1 is new. The electric storage device 1 as shown in FIG. 1 is not new, but in a used state in which recharging and discharging have been repeated, therefore, the electrolyte solution 18 is reduced from a fully charged state due to electrolysis or evaporation. Consequently, a part of the electrode assembly 20 not submerged in electrolyte solution 18 may be exposed. A submersion level of a liquid surface of the electrolyte 18 shall not be limited to the exemplary level shown in FIG. 1 and may be above or below the level shown in FIG. 1.

Figure 2:
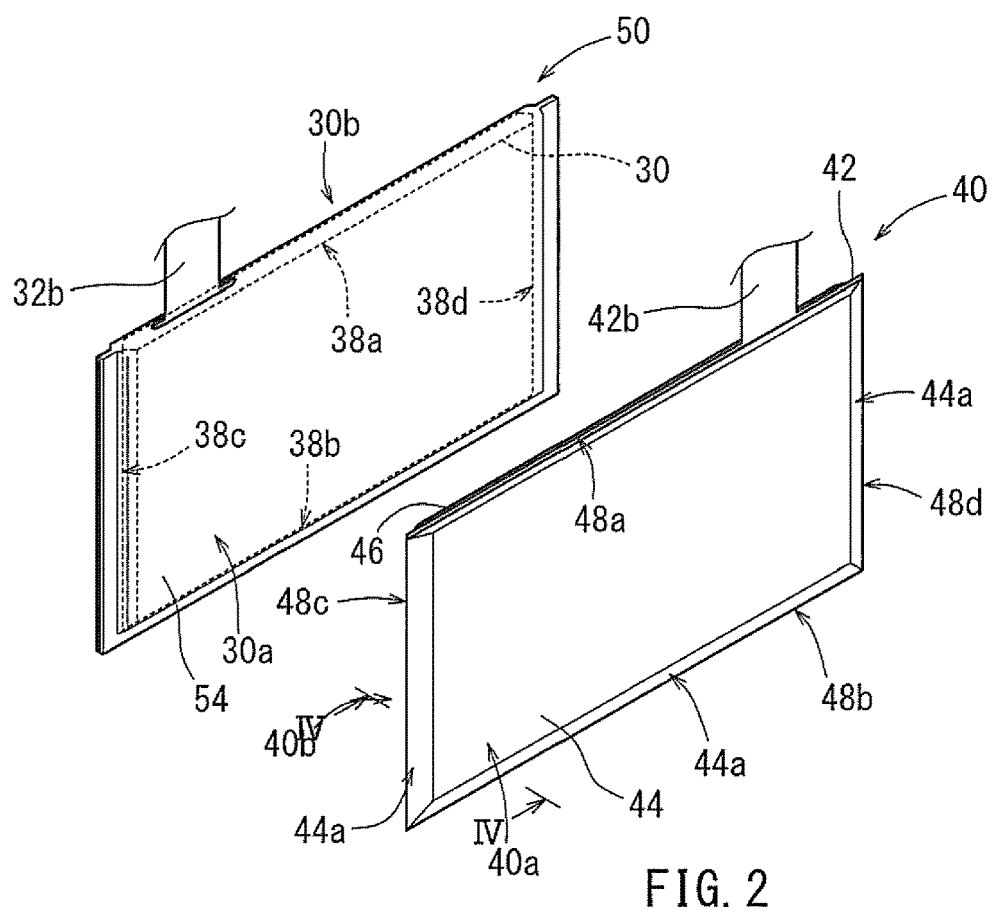
FIG. 2 is a perspective view of a positive electrode plate unit and a negative electrode plate.
Figure 3:
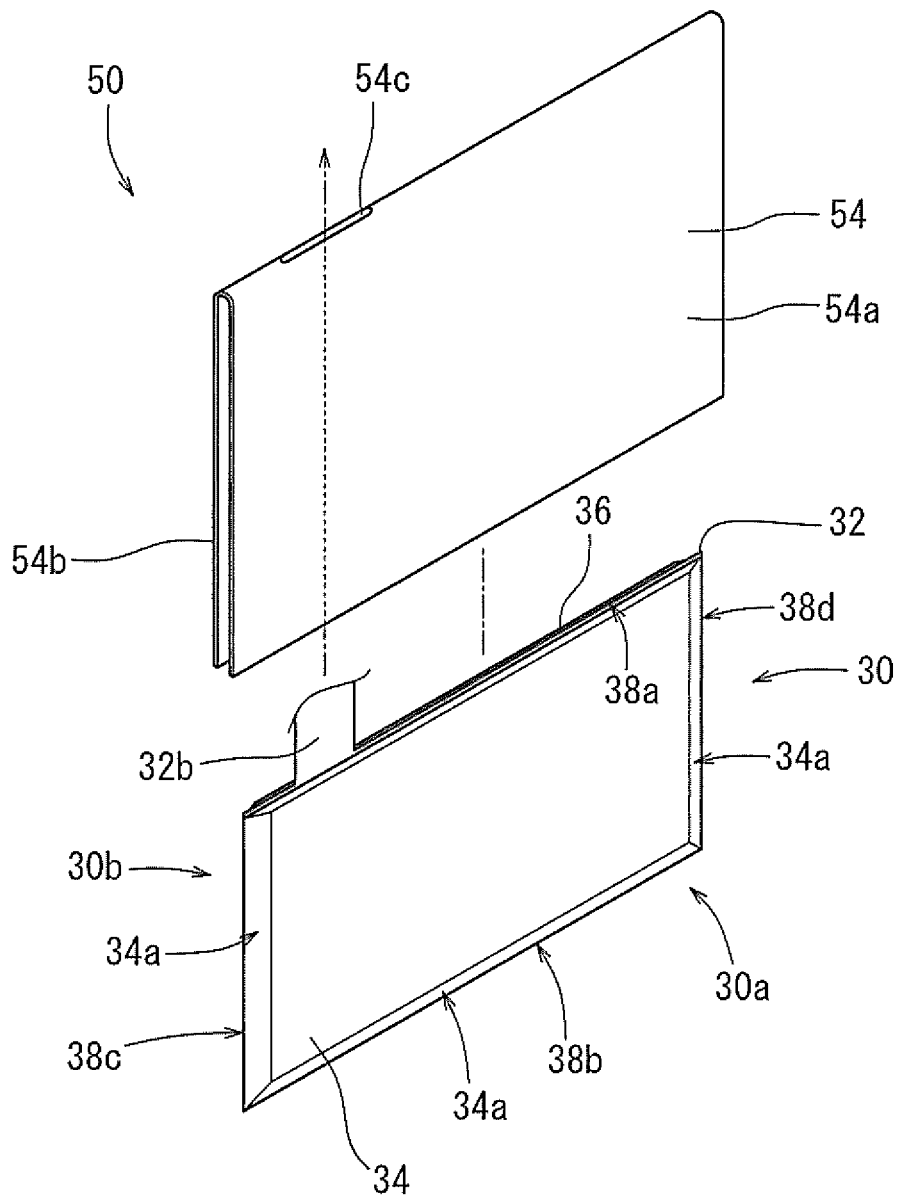
FIG. 3 is an exploded perspective view of the positive electrode plate unit.

The electrode assembly 20 is configured such that positive electrode plate units 50 (electrode plate units) and negative electrode plates 40 are stacked in an alternating manner. As shown in FIG. 2 and FIG. 3, the positive electrode plate unit 50 includes a positive electrode plate 30 and an enveloping separator 54. The positive electrode plate 30 is configured in a rectangular shape. The separator 54 is a thin film made of porous resin which is folded approximately in half lengthwise. Opposite lateral faces of the positive electrode plate 30 are enveloped by the separator 54 in a saclike manner. As shown in FIG. 3, the portion of positive electrode plate 30 including the opposing lateral faces and their shared contiguous lengthwise edge at the top of the plate is collectively interposed between the separator 54 that is folded in half. The separator 54 includes a first separator part 54a configured to cover a front surface 30a of the positive electrode plate 30 and a second separator part 54b configured to cover a rear surface 30b, the opposite lateral face of front surface 30a, of the positive electrode plate 30. Both separator parts 54a and 54b have a surface area larger than that of the lateral faces of the positive electrode plate 30. After the interposition of positive electrode plate 30, both separator parts 54a and 54b are welded together along their respective outer peripheries of three edges, outward of the corresponding outer peripheries of the positive electrode plate 30, excluding the shared contiguous lengthwise positive electrode tab edge 38a at the top of the positive electrode plate 30, where the edge of separator 54 marking the folding between 54a and 54b fits over edge 38a. In particular, the positive electrode tab 32b protrudes upward out of the separator 54 through a complementary sized opening hole 54c of the separator 54. Instead of being folded in half in this manner, the positive electrode unit 50 may also instead include separators that cover individually a front or rear opposing lateral surface of the positive electrode plate 30, where the outer peripheries of the separators may be welded to each other outward of the corresponding outer peripheries of all four edges of the positive electrode plate 30.

Figure 4:
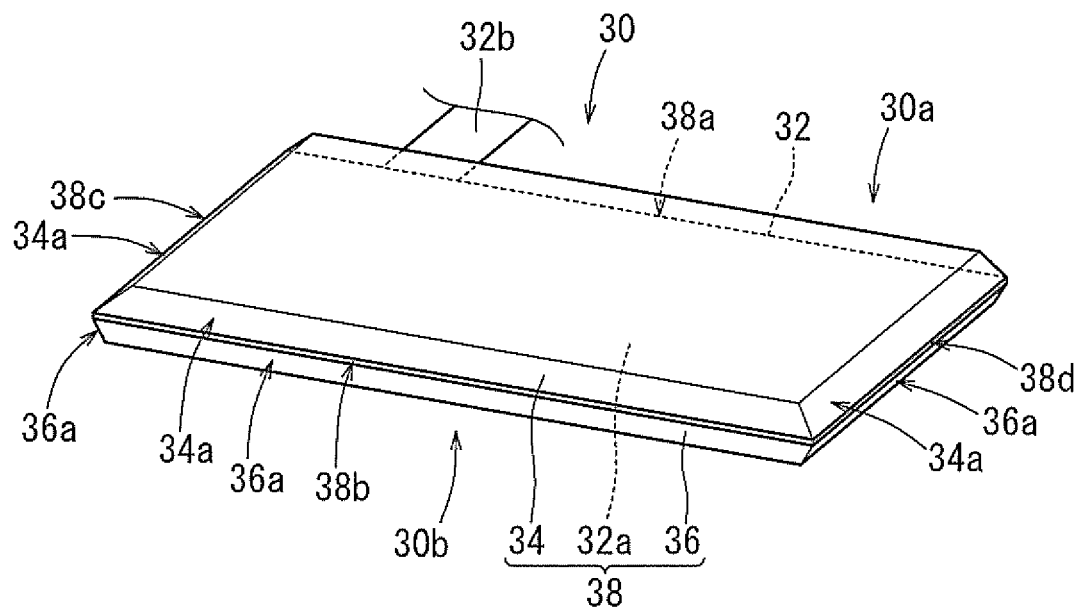
FIG. 4 is a perspective view of a positive electrode plate.
Figure 6:
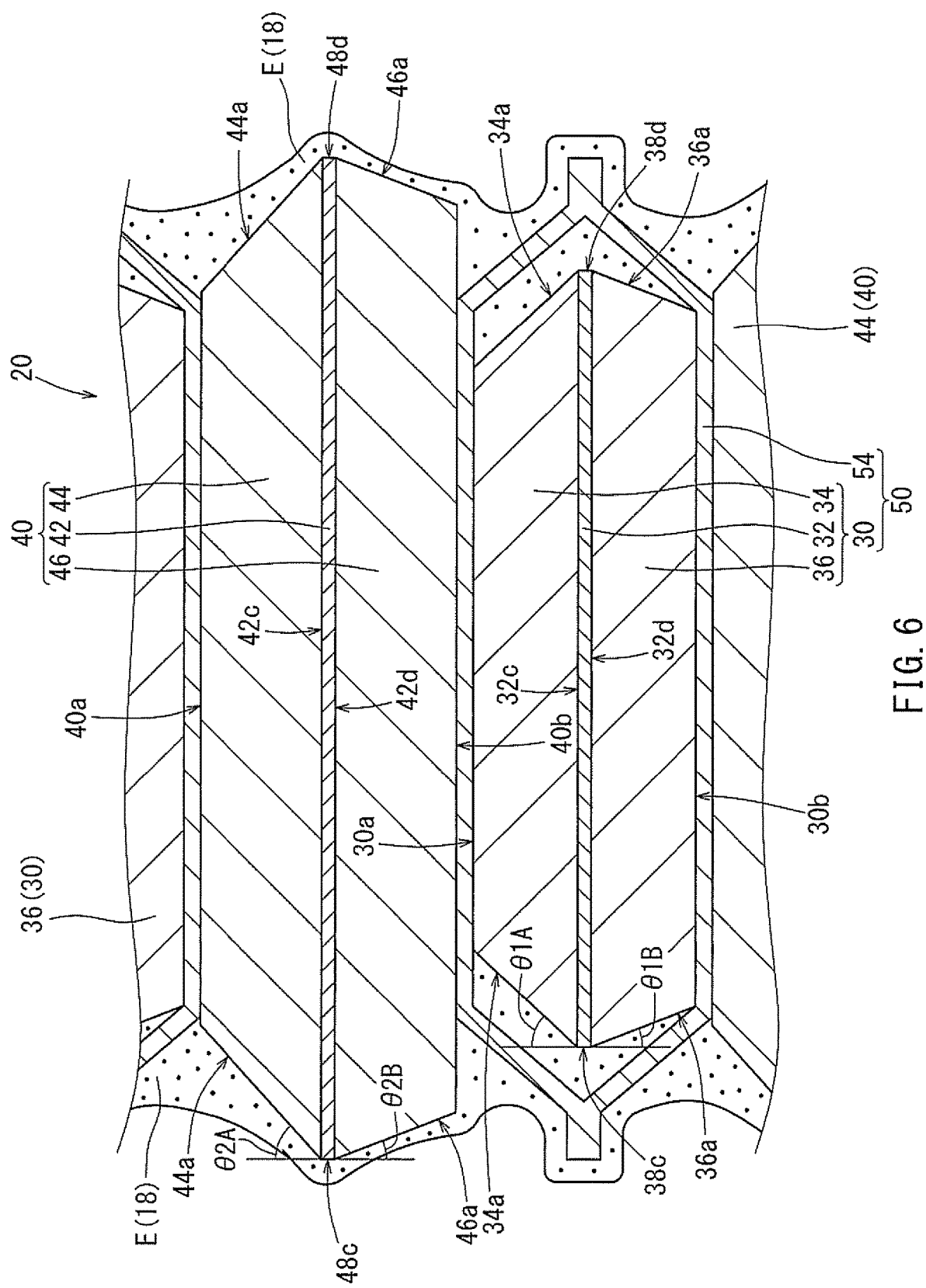
FIG. 6 is a cross-sectional view of the electrode assembly.

As shown in FIGS. 3, 4 and 6, the positive electrode plate 30 includes a positive electrode metal foil 32, a front positive electrode active material layer 34 and a rear positive electrode active material layer 36. The positive electrode metal foil 32 may be, for example, an aluminum foil. The positive electrode metal foil 32 includes a flat (two-dimensional) rectangular shaped positive electrode main body 32a and a positive electrode tab 32b, which extends from one side of the positive electrode main body 32a. The front positive electrode active material layer 34 is provided on the front surface 32c of the positive electrode metal foil 32 and may cover substantially the entire area of one of two lateral faces of the rectangular positive electrode main body 32a. The rear positive electrode active material layer 36 is provided on the rear surface 32d of the positive electrode metal foil 32 and may cover substantially the entire area of the other, opposing lateral face of the rectangular positive electrode main body 32a. Both positive electrode active material layers 34 and 36 are made of, for example, a lithium-containing metal oxide. The electrolyte solution 18 (see FIG. 1) impregnates both positive electrode active material layers 34 and 36 after the positive electrode plate 30 is accommodated in the case 10 together with the electrolyte solution 18 in which the plate is submerged. Referring to FIG. 4, the positive electrode main body 32a together with both positive electrode active material layers 34 and 36 collectively constitute a positive electrode base 38.

The front positive electrode active material layer 34 and the rear positive electrode active material layer 36 are intentionally provided so as to not cover the positive electrode tab 32b, so that the positive electrode metal foil 32 may be exposed at the positive electrode tab 32b. The positive electrode tabs 32b of each positive electrode plate 30 are laminated in combination with each other and may collectively, for example, be welded to one external connection terminal 14 (see FIG. 1). In this specification, an edge of the positive electrode plate 30 provided along with the positive electrode tab 32b, comprising the shared contiguous edge of the opposite lateral faces of the positive electrode plate 30 at the top of the plate, perpendicular to positive electrode tab 32b, is referred to as a positive electrode tab edge 38a. An edge vertically opposed to the positive electrode tab edge 38a is referred to as a positive electrode tab opposing edge 38b. Two edges parallel to positive electrode tab 32b and orthogonal to the positive electrode tab edge 38a and the positive electrode tab opposing edge 38b on both the left and right sides of tab 32b are referred to as a first positive electrode edge 38c and a second positive electrode edge 38d.

As shown in FIGS. 3, 4 and 6, the front positive electrode active material layer 34 includes positive electrode large tapered portions 34a. The positive electrode large tapered portions 34a are respectively provided along the positive electrode tab opposing edge 38b, first positive electrode edge 38c and second positive electrode edge 38d. Each positive electrode large tapered portion 34a is linearly inclined from each corresponding edge 38b, 38c and 38d rearward and outward toward the interior of the positive electrode plate 30, on the front surface 32c of the positive electrode metal foil 32, with respect to the rear-to-front direction along the thickness of the positive electrode plate 30. Each of the positive electrode large tapered portions 34a is configured to have a positive electrode large inclination angle θ1A (see FIG. 6) relative to the rear-to-front directional axis along the thickness of the positive electrode plate 30.

As shown in FIGS. 4 and 6, the rear positive electrode active material layer 36 includes positive electrode small tapered portions 36a. The positive electrode small tapered portions 36a are respectively provided along the positive electrode tab opposing edge 38b, the first positive electrode edge 38c and the second positive electrode edge 38d. Each of the positive electrode small tapered portions 36a is linearly inclined frontward from each corresponding edge 38b, 38c and 38d toward the interior of the positive electrode plate 30, on the rear surface 32d of the positive electrode metal foil 32, with respect to the rear-to-front direction along the thickness of positive electrode plate 30. Each of the positive electrode small tapered portions 36a is configured to have a positive electrode small inclination angle θ1B (see FIG. 6) relative to the rear-to-front directional axis along the thickness of the positive electrode plate 30. The positive electrode small inclination angle θ1B is smaller than the positive electrode large inclination angle θ1A. The positive electrode small inclination angle θ1B may be 0 degrees, in which case, the positive electrode small tapered portions 36a are not formed.

Figure 5:
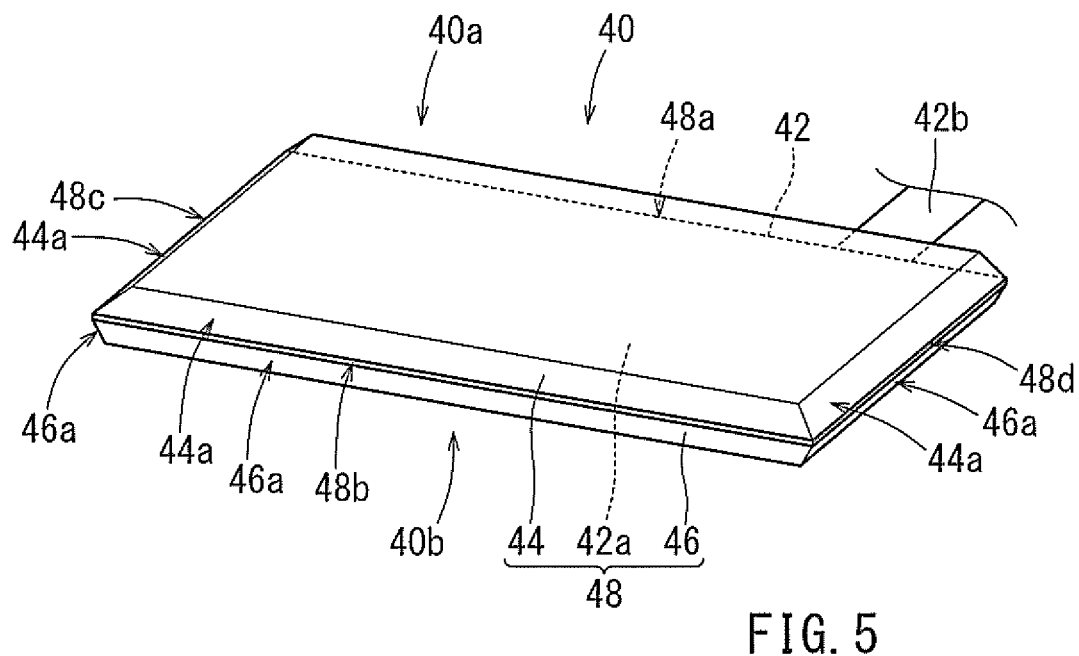
FIG. 5 is a perspective view of the negative electrode plate.

As shown in FIGS. 2, 5 and 6, the negative electrode plate 40 includes a negative electrode metal foil 42, a front negative electrode active material layer 44 and a rear negative electrode active material layer 46. The negative electrode metal foil 42 may be, for example, a copper foil. The negative electrode metal foil 42 includes a rectangular negative electrode main body 42a and a negative electrode tab 42b which extends from an upper edge of the negative electrode main body 42a. The surface area of the negative electrode main body 42a is larger than the above-described area of the positive electrode main body 32a. The front negative electrode active material layer 44 is provided on the front surface 42c of the negative electrode metal foil 42 and may substantially cover the entire surface area of the front surface of the negative electrode main body 42a. The rear negative electrode active material layer 46 is provided on the rear surface 42d of the negative electrode metal foil 42 and may substantially cover the entire surface area of the rear surface of the negative electrode main body 42a. Both negative electrode active material layers 44 and 46 may include, for example, carbon. The electrolyte solution 18 (see FIG. 1) is impregnated in both positive electrode active material layers 44 and 46 after the negative electrode plate 40 is accommodated in the case 10 and submerged in the electrolyte solution 18. As referring to FIG. 5, the negative electrode main body 42a and both negative electrode active material layers 44 and 46 collectively constitute a negative electrode base 48.

The front negative electrode active material layer 44 and rear negative electrode active material layer 46 do not cover the area where the negative electrode tab 42b projects outward so that the negative electrode metal foil 42 at the negative electrode tab 42b is exposed. The negative electrode tabs 42b of each negative electrode plate 40 are laminated in combination with each other and may, for example, be collectively welded to one external connection terminal 16 (see FIG. 1). In this specification, an edge of the negative electrode plate 40 provided with the negative electrode tab 42b at the top of the negative electrode plate 40 is referred to as negative electrode tab edge 48a. An edge vertically opposed to the negative electrode tab edge 48a is referred to as a negative electrode tab opposing edge 48b. Two edges orthogonal to the negative electrode tab edge 48a and the negative electrode tab opposing edge 48b, and parallel to the negative electrode tab 42b, located at the left and ride sides of said electrode tab 42b, are respectively referred to as a first negative electrode edge 48c and a second negative electrode edge 48d.

As shown in FIGS. 2, 5 and 6, the front negative electrode active material layer 44 includes negative electrode large tapered portions 44a. The negative electrode large tapered portions 44a are respectively provided along the negative electrode tab opposing edge 48b, the first negative electrode edge 48c, and the second negative electrode edge 48d. Each of the provided negative electrode large tapered portions 44a is linearly inclined frontward from each corresponding edge 48b, 48c and 48d, toward the interior of the negative electrode plate 40, on the front surface 42c of the negative electrode metal foil 42. Each of the negative electrode large tapered portions 44a is configured to have a negative electrode large inclination angle θ2A relative to the rear-to-front axis along the thickness of the negative electrode plate 40 (see FIG. 6). The negative electrode large inclination angle θ2A is larger than the above described positive electrode large inclination angle θ1A.

As shown in FIGS. 5 and 6, the rear negative electrode active material layer 46 includes negative electrode small tapered portions 46a. The negative electrode small tapered portions 46a are respectively provided along the negative electrode tab opposing edge 48b, the first negative electrode edge 48c, and the second negative electrode edge 48d. Each of the negative electrode small tapered portions 46a is linearly inclined frontward from each corresponding edge 48b, 48c and 48d toward the interior of the negative electrode plate 40, on the rear surface 42d of the negative electrode metal foil 42. Each of the negative electrode small tapered portions 46a is configured to have a negative electrode small inclination angle θ2B (see FIG. 6). The negative electrode small inclination angle θ2B is smaller than the negative electrode large inclination angle θ2A. The negative electrode small inclination angle θ2B may be 0 degrees. In this case, the negative electrode small tapered portions 46a are not formed.

FIG. 6 illustrates the inside of the electric storage device 1 from a top view, above the liquid surface interface of the electrolyte solution 18 (see FIG. 1). The electrolyte solution 18 impregnates each pair of active material layers 34 and 36, as well as 44 and 46 for the positive electrode plate 30 and negative electrode plate 40, respectively. The electrolyte solution 18 stays around each electrode plate 30 and 40 and the separator 54 due to surface tension to form the built up electrolyte E. Each pair of the active material layers 34 and 36, 44 and 46 expands and contracts while the electric storage device 1 is charged and discharged. In accordance with this expansion and contraction, the surrounding electrolyte solution 18 flows out and back between the built up electrolyte E and each of the active material layers 34 and 36, 44 and 46. The electrolyte solution 18 is supplied to each of the active material layers 34 and 36, 44 and 46 as the electrolyte solution 18 returns to each of the active material layers 34 and 36, 44 and 46. Each of the active material layers 34 and 36, 44 and 46 is impregnated with the electrolyte solution 18 so as not to dry. In FIG. 6, the built up electrolyte E is shown in dotted areas.

As shown in FIG. 6, the built up electrolyte E is formed along the positive electrode large tapered portion 34a to be directed toward the interior of the positive electrode plate 30. This formation promotes the supply of the electrolyte solution 18 toward the inside of the positive electrode plate 30 in the electrolyte solution 18. As a result of this formation, the impregnation efficiency of the electrolyte solution 18 in the front positive electrode active material layer 34 may be improved, and consequently the supply of the electrolyte solution 18 to the rear negative electrode active material layer 46, vertically opposed to the front positive active material layer 34 with the separator 54 interposed therebetween, is promoted as well. Therefore, due to the formation of the built up electrolyte E along 34a, the impregnation efficiency of the electrode solution 18 is improved in front positive electrode active material layer 34, and also in the rear negative electrode active material layer 46.

As shown in FIG. 6, the built up electrolyte E is formed along the negative electrode large tapered portion 44a to be directed toward the interior of the negative electrode plate 40. This formation promotes the supply of the electrolyte solution 18 toward the inside of the negative electrode plate 40 in the front negative electrode active material layer 44. As a result, the impregnation efficiency of the electrolyte solution 18 in the rear negative electrode active material layer 44 may be improved, and consequently the supply of the electrolyte solution 18 to the rear positive electrode active material layer 36, vertically opposed to the front negative active material layer 44 with the separator 54 interposed therebetween, is promoted as well. Therefore, due to the formation of the built up electrolyte E along 44a, the impregnation efficiency of the electrode solution 18 is improved in front negative electrode active material layer 44, and also in the rear positive electrode active material layer 36.

Figure 7:
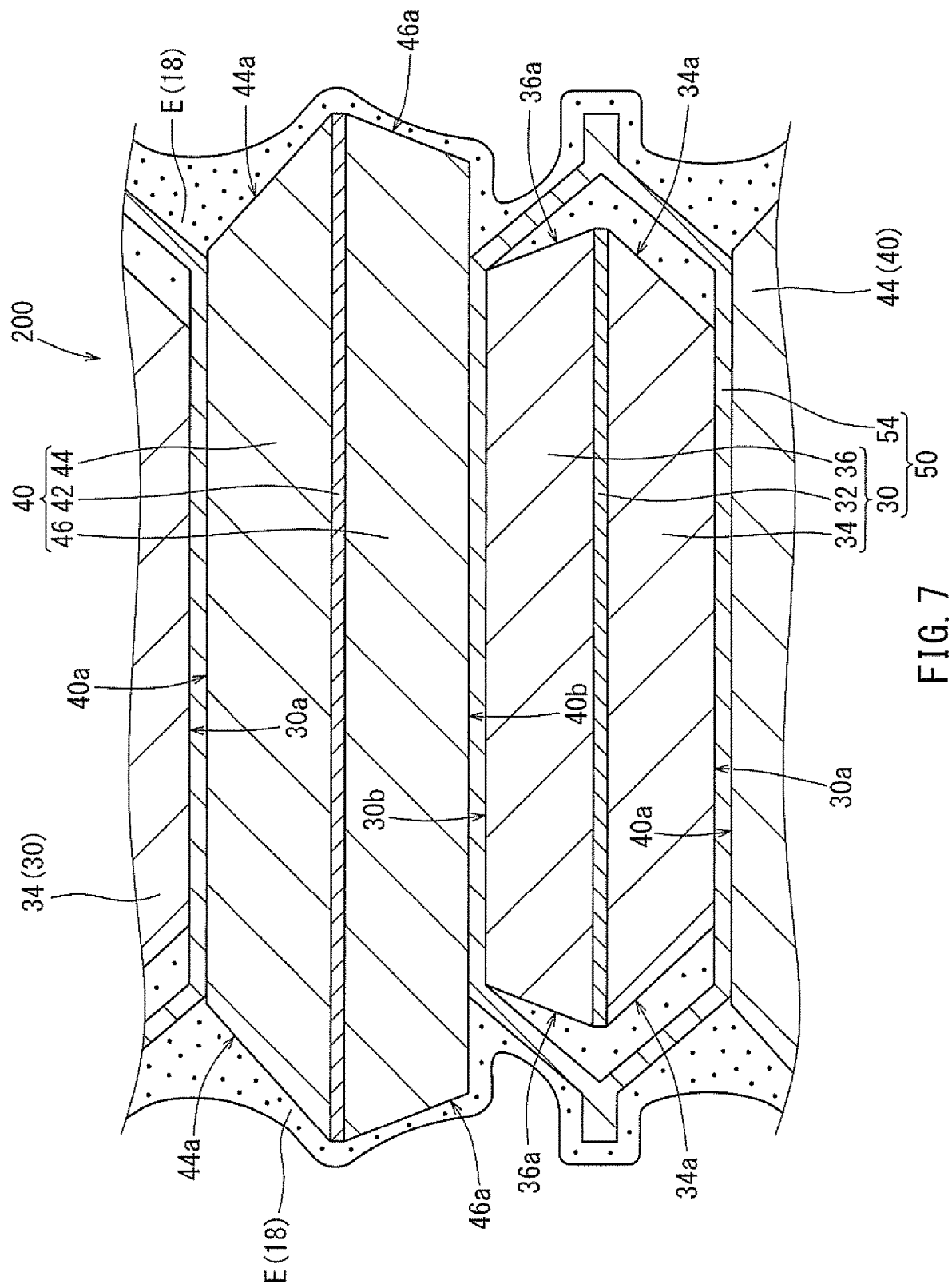
FIG. 7 is a cross-sectional view of the electrode assembly as a comparative example.

As shown in FIG. 6, the positive electrode plate 30 and the negative electrode plate 40 are laminated with the respective front surface 30a and 40a of each plate having the positive electrode large tapered portion 34a and the negative electrode large tapered portion 44a oriented in the same general direction, inclined at a positive angle with respect to the rear-to-front directional axis along the thickness of the plates. Therefore, in the electrode assembly 20, clearances into which the electrolyte solution 18 can enter may be disposed in a distributed manner as compared with the case where, for example, the positive electrode plates 30 and the negative electrode plates 40 are laminated with their front surfaces 30a and 40a opposed to each other as, for example, in an electrode assembly 20 shown in FIG. 7. As a result of the distributed manner of the clearances, with this electrode assembly 20, the uneven impregnation of the electrolyte solution 18 in the laminating direction of the positive electrode plates 30 and negative electrode plates 40 may be suppressed while the evenly distributed supply of the electrolyte solution 18 in each pair of the active material layers 34 and 36, as well as 44 and 46, is promoted as described above. The inclination angles θ1B and θ2B of the positive electrode small tapered portion 36a and the negative electrode small tapered portion 46a in the positive electrode plate 30 and the negative electrode plate 40, respectively, are set to be small. In this way, with a smaller angle resulting in a larger material area, sufficient capacity for the respective active material at the positive electrode plate 30 and the negative electrode plate 40 can be ensured.

As shown in FIG. 6, the positive electrode large tapered portion 34a is surrounded by the separator 54. The separator 54 provides a barrier to the built up electrolyte E formed along the positive electrode large tapered portion 34a from the outside to be a part of a plane which retains the built up electrolyte E. In this way, the separator 54 facilitates the formation of the built up electrolyte E. The negative electrode large tapered portion 44a is exposed outside of the separator 54. Therefore, the built up electrolyte E formed along the negative electrode large tapered portion 44a is retained minimally compared to the built up electrolyte E formed along the positive electrode large tapered portion 34a. Accordingly, it is possible to equalize an amount of the built up electrolyte E, formed at the positive electrode large tapered portion 34a and the negative electrode large tapered portion 44a, respectively, by setting the positive electrode large inclination angle θ1A to be smaller than the negative electrode large inclination angle θ2A. As a result of the equalization of built up electrolyte E, the uneven impregnation of the electrolyte solution 18 among the positive electrode plate 30 and the negative electrode plate 40 in the laminating direction can be suppressed in the electrode assembly 20.

Typically, in the electrode assembly 20, force may mostly be applied at the respective outer edge of the positive electrode plate 30 and the outer edge of the negative electrode plate 40. Consequently, the positive electrode plate 30 and the negative electrode plate 40 may touch each other (internal short circuit) if the separator 54 is torn between each of the outer edges. For this reason, in the electrode assembly 20 shown in FIG. 6, the positive electrode large tapered portion 34a and the negative electrode large tapered portion 44a are provided at the respective outer edges of the positive electrode plate 30 and the negative electrode plate 40 at an inclined angle as described. As a result, a clearance corresponding to the space between the inclined large tapered portions 34a and 44a is formed between each of the outer edges of the positive electrode plate 30 and the negative electrode plate 40 such that an internal short circuit can be prevented even if the separator at the outer edge of the positive electrode plate 30 and the negative electrode plate 40 is torn due to applied force, etc.

Figure 8:
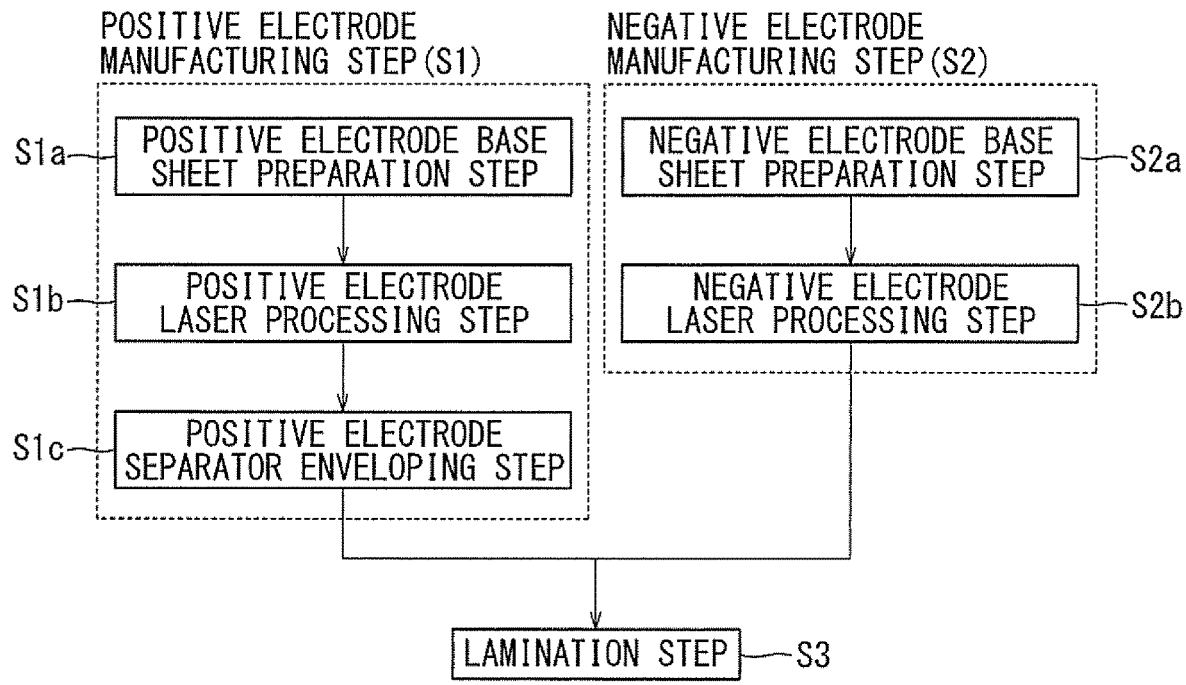
FIG. 8 is a flow chart of a manufacturing process of the electrode assembly.

Further, a method for manufacturing the electrode assembly 20 will be described. As shown in FIG. 8, the method for manufacturing the electrode assembly 20 includes a positive electrode plate manufacturing step S1, a negative electrode plate manufacturing step S2, and a lamination step S3. The positive electrode plate manufacturing step S1 includes a positive electrode base sheet preparation step S1a, a positive electrode laser processing step S1b, and a positive electrode separator enveloping step S1c. The negative electrode plate manufacturing step S2 includes a negative electrode base sheet preparation step S2a and a negative electrode laser processing step S2b. The positive electrode plate producing step S1 and the negative electrode plate preparing step S2 may be performed in parallel, or sequentially. The lamination step S3 may be performed after the positive electrode plate manufacturing step S1 and the negative electrode plate manufacturing step S2.

Figure 9:
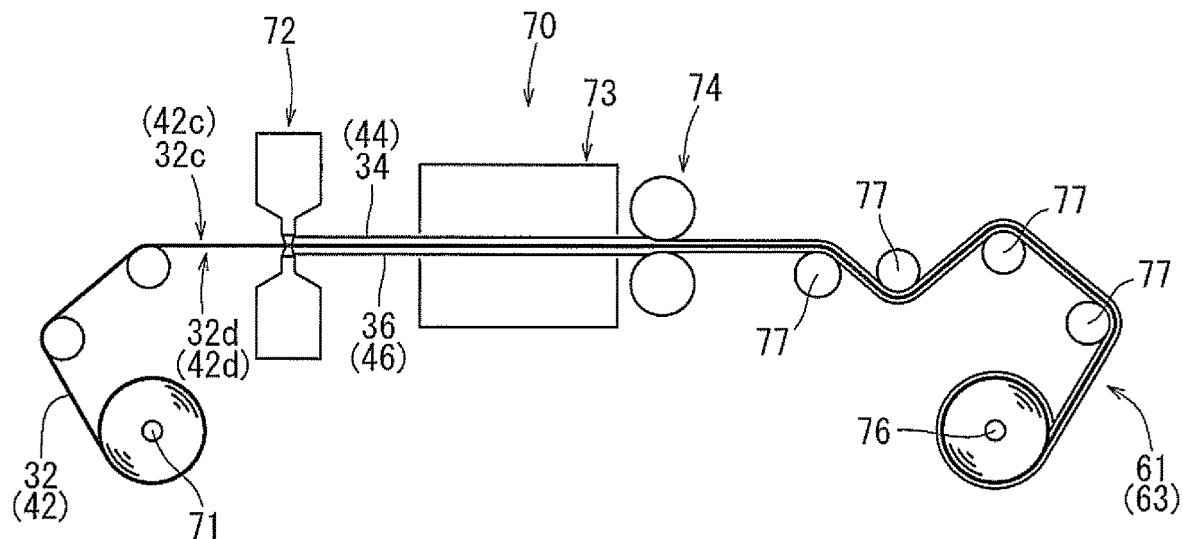
FIG. 9 is a schematic side view of a coating-and-drying apparatus.

As shown in FIG. 9, a coating-and-drying apparatus 70 is used in the positive electrode base sheet preparation step S1a. The coating-and-drying apparatus 70 comprises a supply roller 71, a coating apparatus 72, a dryer 73, a press roller 74 and a take-up roller 76. As shown in FIG. 9, the positive electrode metal foil 32 is rolled out from the supply roller 71 and passes through the coating apparatus 72, the dryer 73 and the press roller 74 in succession. The positive electrode metal foil 32 is coated with an active material on both sides of the positive electrode metal foil 32 by the coating apparatus 72. This coating results in the formation of the front positive electrode active material layer 34 on the front surface 32c of the positive electrode metal foil 32 and the rear positive electrode active material layer 36 on the rear surface 32d. Both positive electrode active material layers 34 and 36 are dried by the dryer 73 and pressed by the press roller 74 in a rear-to-front directional axis along the thickness of the positive electrode plates and the negative electrode plates. In this way, a positive electrode base sheet 61 having each of the positive electrode active material layers 34 and 36 formed on the front and rear surfaces of the positive electrode metal foil 32, respectively, is manufactured. The manufactured positive electrode base sheet 61 is then rolled up by the take-up roller 76 while being tensioned with each of the rollers 77.

Figure 10:
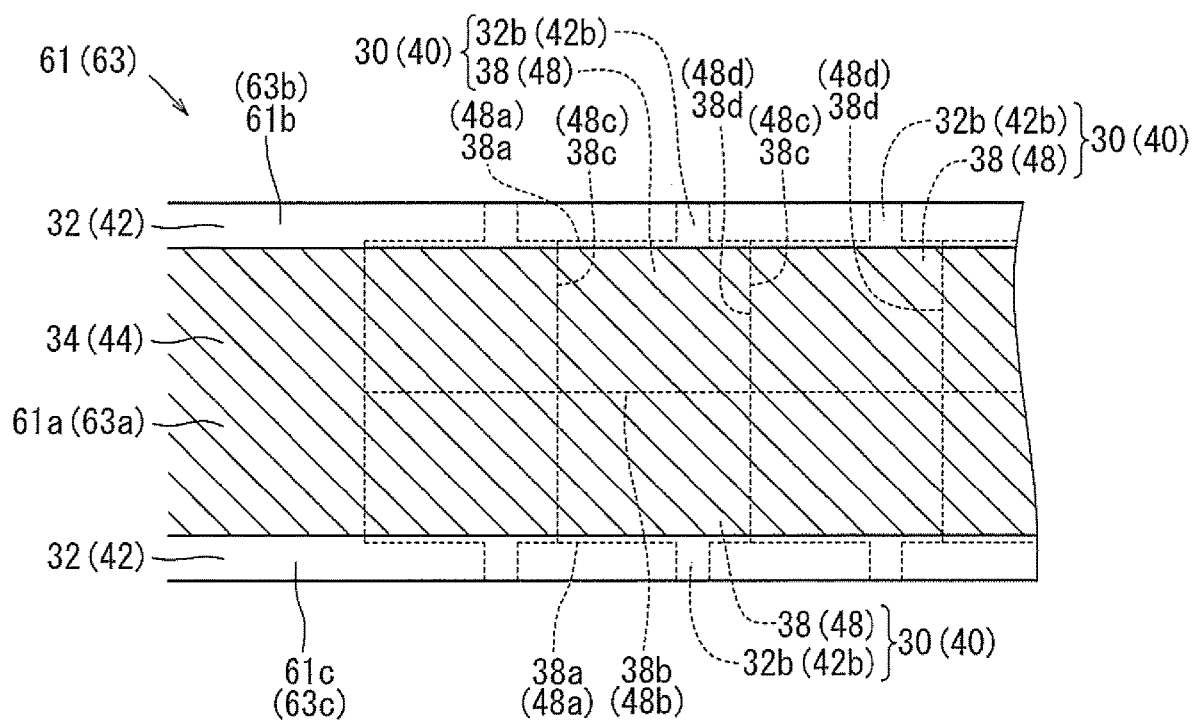
FIG. 10 is a plan view of front surfaces of a positive electrode base sheet and a negative electrode base sheet.

The positive electrode base sheet 61 includes the strip-shaped positive electrode metal foil 32, the front positive electrode active material layer 34, and the rear positive electrode active material layer 36, formed collectively as described above. Both positive electrode active materials 34 and 36 are formed in the active material layer formation regions 61a (see FIG. 10) corresponding to each other at the same position on the front surface 32c and the rear surface 32d of the positive electrode metal foil 32, respectively. In FIG. 10, lines to be cut by a laser beam LS (see FIG. 13), which will be described later, are shown as dotted lines. The width of the active material layer formation region 61a (height in FIG. 10) corresponds to substantially double of the length from the positive electrode tab opposing edge 38b to the positive electrode tab edge 38a. Both the uppermost and lowermost sides of the positive electrode base sheet 61 in a widthwise direction are configured as metal foil exposed regions 61b and 61c as shown in FIG. 10 where in these regions front positive electrode active material layer 34 and the rear positive electrode active material layer 36 are not provided so as to expose the negative electrode metal foil 32. The width of each metal foil exposed region, 61b and 61c, respectively, corresponds to the length of the positive electrode tab 32b in an extending direction as shown, e.g., in FIG. 2. The active material layer formation region 61a and both metal foil exposed regions 61b and 61c are continuous over the entire length of the positive electrode base sheet 61 in the longitudinal direction. In FIG. 10, the active material layer formation region 61a is indicated by the pattern of diagonal lines. The positive electrode base sheet 61 will then be transferred to the positive electrode laser processing step S1b as will be described next.

Figure 11:
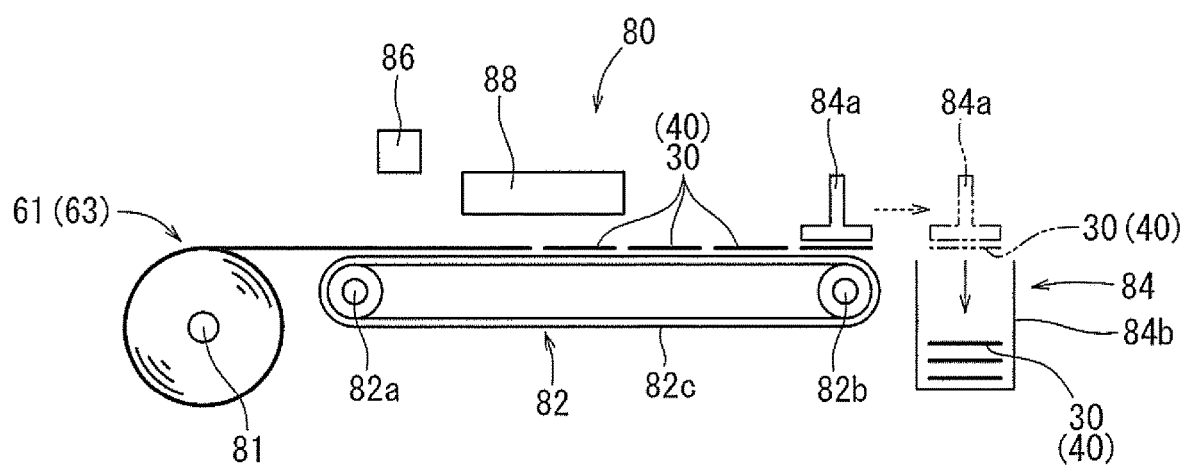
FIG. 11 is a schematic side view of a laser processing apparatus.

In the positive electrode laser processing step S1b, a laser processing apparatus 80 may be used. As shown in FIG. 11, the laser processing apparatus 80 includes a supply roller 81, a conveying device 82, a laser apparatus 88, a controller 86 and a collector 84. The conveying device 82 is a conveyor that includes a belt 82c stretched around a pair of rollers 82a and 82b. The conveying device 82 conveys the positive electrode base sheet 61 on an upper surface of the belt 82c in one direction. The positive electrode base sheet 61 is rolled out from the supply roller 81 and conveyed under predetermined tension. The motion of the conveyor 82 is controller by the controller 86. The conveying device 82 moves the positive electrode base sheet 61 by a predetermined distance, wherein the belt 82c wraps around the rollers and the conveyance is repeated over the same distance conveyance, and the conveying device 82 periodically suspends the conveyance of the positive electrode base sheet 61.

Figure 12:
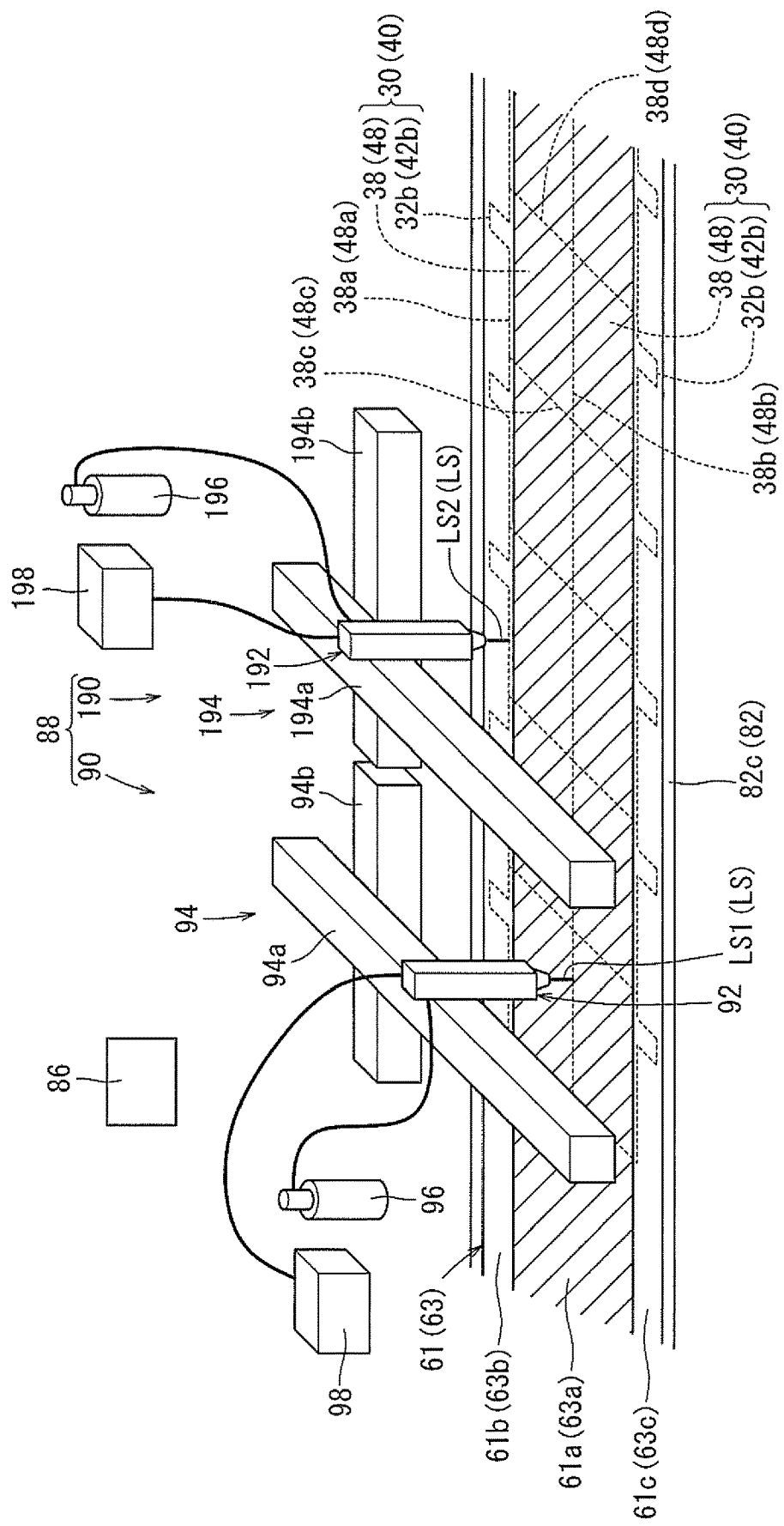
FIG. 12 is a schematic perspective view of the laser processing apparatus.

As shown in FIG. 12, the laser apparatus 88 includes a first laser apparatus 90 and a second laser apparatus 190. The first laser apparatus 90 irradiates the active material layer formation region 61a with the first laser beam LS1. The second laser apparatus 190 irradiates both of the metal foil exposed regions 61b and 61c with second laser beam LS2. Hereinafter, both lasers LS1 and LS2 are individually referred to the first laser beam LS1 and the second laser beam LS2, respectively, to distinguish between them, while are collectively referred to as the laser beam LS. Two second laser apparatuses 190b may be provided for corresponding to both the metal foil exposed regions 61b and 61c. FIG. 12 illustrates an example in which only one second laser apparatus 190 is provided.

As shown in FIG. 12, the first laser apparatus 90 includes a laser head 92, an XY-axis robot 94, an assist gas feeder 96, and a laser beam oscillator 98. The laser head 92 is attached to the XY-axis robot 94. The XY-axis robot 94 moves the laser head 92 in the X and Y axial directions. The XY-axis robot 94 includes, for example, an X axis member 94a movably supporting the laser head 62 in an X direction, which corresponds to a widthwise direction of the positive electrode base sheet 61 as described above, and a Y axis member 94b movably supporting the X axis member with attached laser head 62 in a Y direction, which corresponds to a longitudinal direction of the positive electrode base sheet 6. The XY-axis robot 94 is connected to the controller 86, and moves the laser head 92 in accordance with programs stored in the controller 86.

As shown in FIG. 12, the assist gas feeder 96 is connected to the laser head 92. The assist gas feeder 96 serves to feed assist gas. The laser beam oscillator 98 is connected to the laser head 92, for example, via a fiber cable. The laser beam oscillator 98 serves to supply the laser beam itself to the laser head 92. The laser beam oscillator 98 is connected to the controller 86, for example, via a cable for control signals (not shown). The controller 86 serves to control the supply of the laser beam from the laser beam oscillator 98 to the laser head 92. The controller 89 may supply the laser beam to the laser head 92 while the laser head 92 is moved by the XY-axis robot 94, for example, when the positive electrode base sheet 61 has had conveying movement periodically suspended by the conveying device 82.

Figure 13:
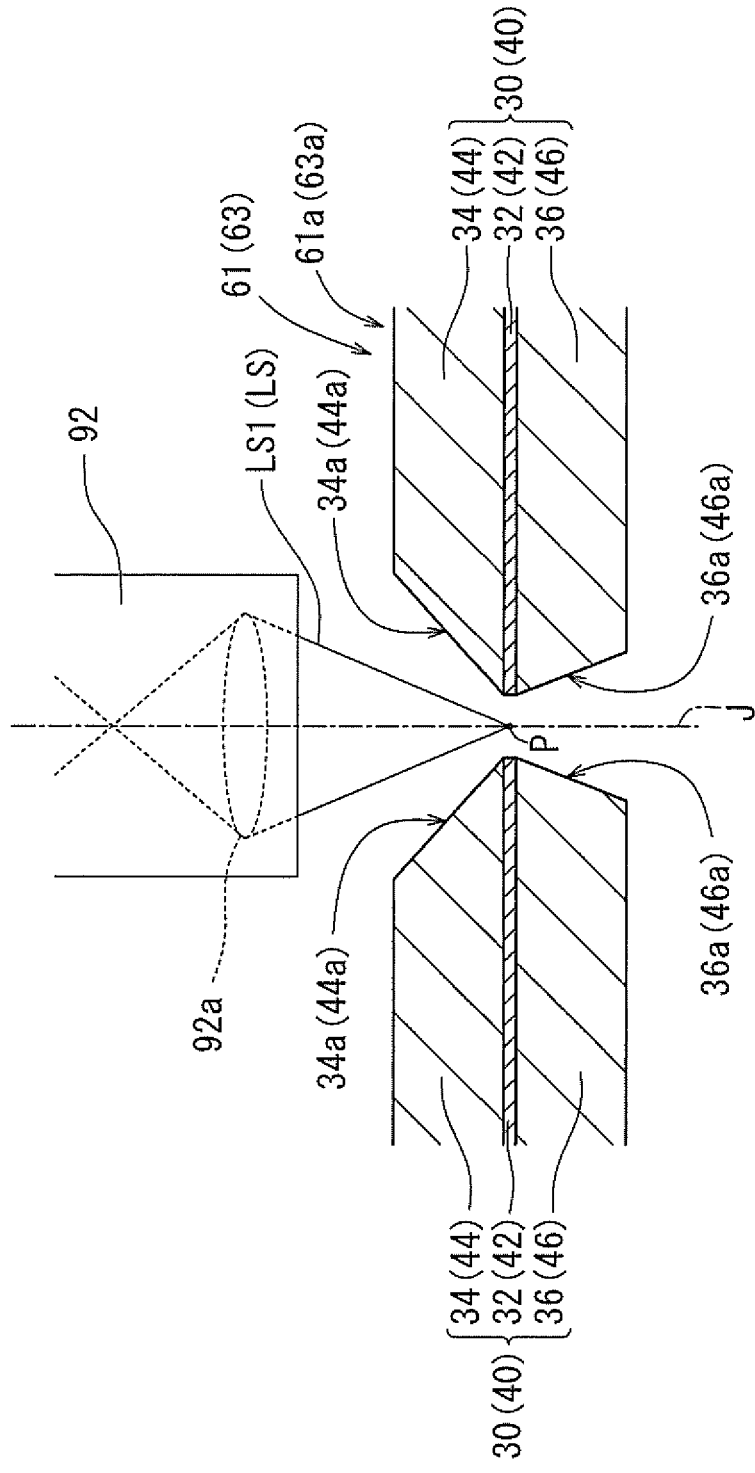
FIG. 13 is a cross-sectional view of a base sheet for showing how the base sheet is cut by the laser processing apparatus.

As shown in FIG. 13, the laser head 92 irradiates the active material layer formation region 61a of the positive electrode base sheet 61 with the first laser beam LS1. The laser head 92 includes a lens 92a. This lens 92a focuses the first laser beam LS1 toward the focal point P that is set at a predetermined position from the bottom of the head 92, lying on the positive electrode base sheet 61. In particular, this focal point P is located in the vicinity of the center of the thickness (widthwise) direction of the positive electrode metal foil 32 and is located, for this reason, within the thickness of the positive electrode metal foil 32. Alternatively, the focal point P may instead be located within the front positive electrode active material layer 34 at its bottom region in the vicinity of the positive electrode metal foil 32 or within the rear positive electrode active material layer 36 at its top region in the vicinity of the positive electrode metal foil 32.

As shown in FIG. 13, the first laser beam LS1 irradiates the positive electrode base sheet 61 such that its optical axis J extends perpendicular to the base sheet 61. Therefore, with this orientation of J, the linear distance of the first laser beam LS1 from the laser head 92, passing through both positive electrode active material layers 34 and 36 and the positive electrode metal foil 32, will be the shortest. In contrast, when the first laser beam LS1 is obliquely irradiated with respect to the positive electrode base sheet 61, then the linear distance is longer. Therefore, because of the orientation of J and the short linear distance, it is possible to set the output of the first laser beam LS1 to be weak. The optical axis J is a straight line passing through the radial center of the lens 92a and the focal point P. The first laser beam LS1 irradiates in the direction from the front positive electrode active material layer 34 toward the rear positive electrode active material layer 36. In so irradiating, the first laser beam LS1 melts and cuts both positive electrode active material layers 34 and 36 and the positive electrode metal foil 32. The above-described assist gas blows away the residual portions of both positive electrode active material layers 34 and 36 as well as the positive electrode metal foil 32 that are melted by the first laser beam LS1.

The first laser beam LS1 is a continuous wave laser. The wave length of the first laser beam LS1 is preferably set within the range of 300 to 1100 nm. The spot diameter of the first laser beam LS1 is preferably set within the range of 10 to 100 μm (micrometer). The cutting speed by the first laser beam LS1 is preferably set within the range of 0.5 to 3 m/s. The output of the first laser beam LS1 is preferably set within the range of 0.01 to 2.0 kW.

As shown in FIG. 12, the second laser apparatus 190 includes a laser head 192, an XY-axis robot 194, an assist gas feeder 196, and a laser beam oscillator 198. Since each of the apparatuses 192, 194, 196 and 198 of the second laser apparatus 190 functions in the same manner as each of the analogous apparatuses 92, 94, 96 and 98 of the first laser device 90, the repeated descriptions shall be omitted. The laser head 92 irradiates both metal foil exposed regions 61b and 61c of the positive electrode base sheet 61 with the second laser beam LS2. Like laser head 92, the laser head 192 also has a lens (not shown). This lens focuses the second laser beam LS2 toward the focal point that is set at a predetermined position from the bottom of the head 192, lying on the positive electrode base sheet 61. The focal point is located in the vicinity of the center of the thickness direction of positive electrode metal foil 32 and is located, for that reason, within the thickness of the positive electrode metal foil 32. The second laser beam LS2 irradiates such that its optical axis extends perpendicular to the positive electrode base sheet 61.

The second laser beam LS2 is a pulse wave laser. The wave length of the second laser beam LS2 is preferably set within the range of 500 to 1100 nm. The spot diameter of the second laser beam LS2 is preferably set within the range of 25 to 100 μm (micrometer). The cutting speed by the second laser beam LS2 is preferably set within the range of 1 to 3 m/s. The output of the second laser beam LS2 is preferably set within the range of 10 to 100 W. The pulse width of the second laser beam LS2 is preferably set narrower than 20 ps (picoseconds). The repetition frequency of the second laser beam LS2 is preferably set within the range of 0.1 to 1 MHz.

As shown in FIG. 12, the laser beam LS cuts the positive electrode plate 30 out of the positive electrode base sheet 61 in a periodic repeating pattern. In FIGS. 10 and 12, lines to be cut by the laser beam LS (not shown in FIG. 10) are indicated by dotted lines. The laser beam LS cuts out positive electrode base portions 38 in a rectangular shape in the active material layer formation region 61a and cuts out positive electrode tabs 32b in both metal foil exposed regions 61b and 61c. The laser beam LS cuts out two positive electrode plates 30 aligned vertically in the widthwise direction of the positive electrode base sheet 61. The first laser beam LS1 cuts out the positive electrode tab opposing edge 38b at the widthwise center of the active material layer formation region 61a along the longitudinal direction of the positive electrode base sheet 61. Further, the first laser beam LS1 also cuts out the first positive electrode edge 38c and second positive electrode edge 38d along the widthwise direction of the positive electrode base sheet 61. The first positive electrode edge 38c and the second positive electrode edge 38d of the positive electrode plates 30 have the same width, are parallel to each other, and are spaced apart by a predetermined distance in the longitudinal direction of the positive electrode base sheet 61. The second laser beam LS2 cuts out the positive electrode tab edge 38a along the longitudinal direction of the positive electrode base sheet 61 at each respective border at the widthwise ends of the sheet, between both metal foil exposed regions 61b and 61c and the active material layer formation region 61a. Further, the second laser beam LS2 cuts out the positive electrode tabs 32b in both of the metal foil exposed regions 61b and 61c, respectively. In FIGS. 10 and 12, the active material layer formation region 61a is indicated by the pattern of diagonal lines.

As shown in FIG. 13, the irradiation of the first laser beam LS1 forms a positive electrode large tapered portion 34a on the front positive electrode active material layer 34. Further, the irradiation of the first laser beam LS1 also forms a positive electrode small tapered portion 36a on the rear positive electrode active material layer 36. The configuration of both tapered portions 34a and 36a is as described above with reference to FIG. 6. Both tapered portions 34a and 36a are formed on opposite sides of each of the positive electrode tab opposing edge 38b, the first positive electrode edge 38c and the second positive electrode edge 38d, respectively. Both tapered portions 34a and 36a are simultaneously formed by irradiation of the first laser beam LS1.

The first laser beam LS1 irradiates the positive electrode base sheet 61 from the laser head 92 in a perpendicular direction to said sheet, as shown in FIG. 13. Consequently, the positive electrode large tapered portions 34a are formed symmetrically on both sides of the widthwise direction of the positive electrode base sheet 61 about the cutting line cut by the first laser beam LS1. Namely, the mutually symmetrical positive electrode large tapered portions 34a about the widthwise directional axis at the cutting axis J are formed at the first positive electrode edge 38c and the second positive electrode edge 38d. Similarly, the mutually symmetrical positive electrode small tapered portions 36a are formed in an analogous manner at the first positive electrode edge 38c and the second positive electrode edge 38d. The two positive electrode plates 30 (see dotted lines extending in the longitudinal direction of the base sheet 61 in FIG. 10) that are cut out in the middle area of the positive electrode base sheet 61 at the widthwise center, extending in the longitudinal direction, have the positive electrode large tapered portions 34a formed at each positive electrode tab opposing edge 38*b*, wherein the shapes of the positive electrode large tapered portions 34*a* are also symmetrical, about the longitudinally extending dotted line at the widthwise center of sheet 61. This also applies by extension to the positive electrode small tapered portions 36*a* formed at each positive electrode tab opposing edge 38*b* on the opposite side of the base sheet 61.

Each positive electrode plate 30 that is cut out by the laser beam LS may be collected by the collection device 84 shown in FIG. 11. The collection device 84 may include, for example, a suction hand 84*a* and a collection box 84*b*. The suction hand 84*a* suctions each positive electrode plate 30 upward from the conveyor belt 82*c*, and then drops each respective plate 30 in the collection box 84*b*. In this manner, each of the positive electrode plates 30 may be stacked in the collection box 84*b*. Each of the stacked positive electrode plate 30 will then be transferred to the positive electrode separator enveloping step S1*c*, which will be described below.

As shown in FIG. 3, in the positive electrode separator enveloping step S1*c*, the positive electrode plate 30 is inserted between the separator 54 folded in half, in the direction on the rear-to-front directional axis along the thickness of said separator. Subsequently, by being enveloped in between the separator 54 in this manner, the front surface 30*a* of the positive electrode plate 30 is covered by the first separator part 54*a* while the rear surface 30*b* of the positive electrode plate 30 is covered by the second separator part 54*b*. The positive electrode tab 32*b* is exposed and projects vertically upward through the opening hole 54*c*. Thereafter, both separator parts 54*a* and 54*b* are welded together at the collective outer periphery of the positive electrode tab opposing edge 38*b*, the first positive electrode edge 38*c*, and the second positive electrode edge 38*d*. As a result, a positive electrode plate unit 50 is produced in which the positive electrode plates 30 are enveloped with the separators 54 having a bag shape. The completed positive electrode plate unit 50 will then be transferred to a lamination step S3, which will be described later.

In the negative electrode sheet preparation step S2*a*, the negative electrode base sheet 63 is prepared in a similar manner to the positive electrode base sheet preparation step S1*a*. Namely, as shown in FIG. 9, the negative electrode metal foil 42 is rolled out from the supply roller 71 and passes through the coating apparatus 72, the dryer 73, and the press roller 74 in succession. As a result, a negative electrode base sheet 63 having the front negative electrode active material layer 44 and the rear negative electrode active material layer 46 formed on both the front and rear surfaces of the negative electrode metal foil 42, respectively, is prepared. The negative electrode base sheet 63 is rolled up by the take-up roller 76.

The negative electrode base sheet 63 includes a strip-shaped negative electrode metal foil 42, the front negative electrode active material layer 44, and the rear negative electrode active material layer 46 as described above. The negative electrode active material layers 44 and 46 are formed at the active material layer formation regions 63*a* (see FIG. 10) on the front surface 42*c* and the rear surface 42*d* of the negative electrode metal foil 42 wherein the front surface 42*c* and the rear surface 42*d* correspond each other at the same position on opposite sides of foil 42. The width of the active material layer formation region 63*a* (height in FIG. 10) corresponds to substantially double the length from the negative electrode tab opposing edge 48*b* to the negative electrode tab edge 48*a*. Both the uppermost and lowermost areas of the negative electrode base sheet 63 in a widthwise direction are configured as metal foil exposed regions 63*b* and 63*c* as shown in FIG. 10 where in these regions front negative electrode active material layer 44 and the rear negative electrode active material layer 46 are not provided so as to expose the negative electrode metal foil 42. The width of each metal foil exposed region, 63*b* and 63*c*, respectively, corresponds to the length of the negative electrode tab 42*b* in an extending direction, as shown, e.g., in FIG. 5. The active material layer formation region 63*a* and both metal foil exposed regions 63*b* and 63*c* are continuous over the entire length of the negative electrode base sheet 63 in the longitudinal direction. In FIG. 10, the active material layer formation region 63*a* is indicated by the pattern of diagonal lines. The negative electrode base sheet 63 will then be transferred to the negative electrode laser processing step S2*b* as will be described next.

In the negative electrode laser processing step S2*b*, the negative electrode plates 40 are cut out of the negative electrode base sheet 63 in a similar procedure to that of the positive electrode laser processing step S1*b*. The laser processing apparatus 80 (see FIG. 11) also operates in the negative electrode laser processing step S2*b* similarly to the positive electrode laser processing step S1*b*. The negative electrode laser processing step S2*b* will be briefly described.

As shown in FIG. 13, the first laser beam LS1 irradiates the active material layer formation region 63*a* of the negative electrode base sheet 63 from the laser head 92. The first laser beam LS1 is focused with the lens 92*a* on the focal point P that is set at a predetermined position from the bottom of the head 92, lying on the negative electrode base sheet 63. In particular, this focal point P is located in the vicinity of the center of the thickness (widthwise) direction of the negative electrode metal foil 42 and is located, for this reason, within the thickness of the negative electrode metal foil 42. Alternatively, the focal point P may instead be located within the front negative electrode active material layer 44 at its bottom region in the vicinity of the negative electrode metal foil 42 or within the rear negative electrode active material layer 46 at its top region in the vicinity of the negative electrode metal foil 42. The first laser beam LS1 irradiates the negative electrode base sheet 63 such that its optical axis J extends perpendicular to the base sheet 63. The first laser beam LS1 irradiates the base sheet 63 through the front negative electrode active material layer 44 to the rear negative electrode active material layer 46.

As shown in FIG. 12, the second laser beam LS2 irradiates the negative electrode base sheet 63 from the laser head 192 to both metal foil exposed regions 63*b* and 63*c* of the base sheet 63. The second laser beam LS2 is focused with the lens of the laser head 192 on the focal point that is set at a predetermined position on the negative electrode base sheet 63. The focal point is located in the vicinity of the center of the thickness (widthwise) of the negative electrode metal foil 42 and may be located, for example, within the thickness of the negative electrode metal foil 42. The second laser beam LS2 may be, for example, irradiate the negative electrode base sheet 63 such that its optical axis extends perpendicular to the base sheet 63.

As shown in FIG. 12, the laser beam LS cuts the negative electrode plates 40 out of the negative electrode base sheet 63. In FIGS. 10 and 12, the lines to be cut by the laser beam LS (not shown in FIG. 10) are indicated by dotted lines. The laser beam LS cuts the negative electrode base portions 48 in a rectangular shape out from the active material layer formation region 63*a*, and cuts the negative electrode tabs 42*b* out from both metal foil exposed regions 63*b* and 63*c*. The laser beam LS cuts out two negative electrode plates 40 aligned vertically in the widthwise direction of the negative electrode base sheet 63. The first laser beam LS1 cuts the negative electrode tab opposing edge 48b out from the widthwise center of the active material layer formation region 63a along the longitudinal direction of the negative electrode base sheet 63. Further, the first laser beam LS1 also cuts out the first negative electrode edge 48c and second negative electrode edge 48d along the width direction of the negative electrode base sheet 63. The first negative electrode edge 48c and the second negative electrode edge 48d of the negative electrode plates 40 have the same width, are parallel to each other, and are spaced apart by a predetermined distance in the longitudinal direction of the negative electrode base sheet 63. The second laser beam LS2 cuts the negative electrode tab edges 48a along the longitudinal direction of the negative electrode base sheet 63 out from each respective border at the widthwise ends of the sheet, between both metal foil exposed regions 63b and 63c and the active material layer formation region 63a. Further, the second laser beam LS2 cuts the negative electrode tabs 42b out from both of the metal foil exposed regions 63b and 63c, respectively. In FIGS. 10 and 12, the active material layer formation region 63a is indicated by the pattern of diagonal lines.

As shown in FIG. 13, the irradiation of the first laser beam LS1 forms a negative electrode large tapered portion 44a on the front negative electrode active material layer 44. In addition, the irradiation of the first laser beam LS1 also forms a negative electrode small tapered portion 46a on the rear negative electrode active material layer 46. The configuration of both tapered portions 44a and 46a is as described above with reference to FIG. 6. Both tapered portions 44a and 46a are formed on opposite sides of the negative electrode tab opposing edge 48b, the first negative electrode edge 48c and the second negative electrode edge 48d, respectively. Both tapered portions 44a and 46a are simultaneously formed by irradiation of the first laser beam LS1.

As shown in FIG. 13, the first laser beam LS1 irradiates the negative electrode base sheet 63 in a perpendicular direction to the base sheet 63. Consequently, the negative electrode large tapered portions 44a are formed symmetrically on both sides of the widthwise direction of the negative electrode base sheet 63 about the cutting line cut by the first laser beam LS1. In other words, the mutually symmetrical negative electrode large tapered portions 44a about the widthwise directional axis at the cutting axis J are formed at the first negative electrode edge 48c and the second negative electrode edge 48d. Similarly, the mutually symmetrical negative electrode small tapered portions 46a are formed in an analogous manner at the first negative electrode edge 48c and the second negative electrode edge 48d. In the two negative electrode plates 40 (see dotted lines extending in the longitudinal direction of the base sheet 63 in FIG. 10) cut out from both sides at the widthwise center of the negative electrode base sheet 63, the shapes of the negative electrode large tapered portions 44a formed at each negative electrode tab opposing edge 48b are also symmetrical with each other about the longitudinally extending dotted line at the widthwise center of sheet 63. This also applies to the negative electrode small tapered portions 46a formed at each negative electrode tab opposing edge 48b on the opposite side of the base sheet 63.

Each negative electrode plate 40 cut out by the laser beam LS may be stacked in a collection box 84b by the collection device 84 shown in FIG. 11. Each negative electrode plate 40 will then be transferred to the lamination step S3, which will be described below.

Figure 14:
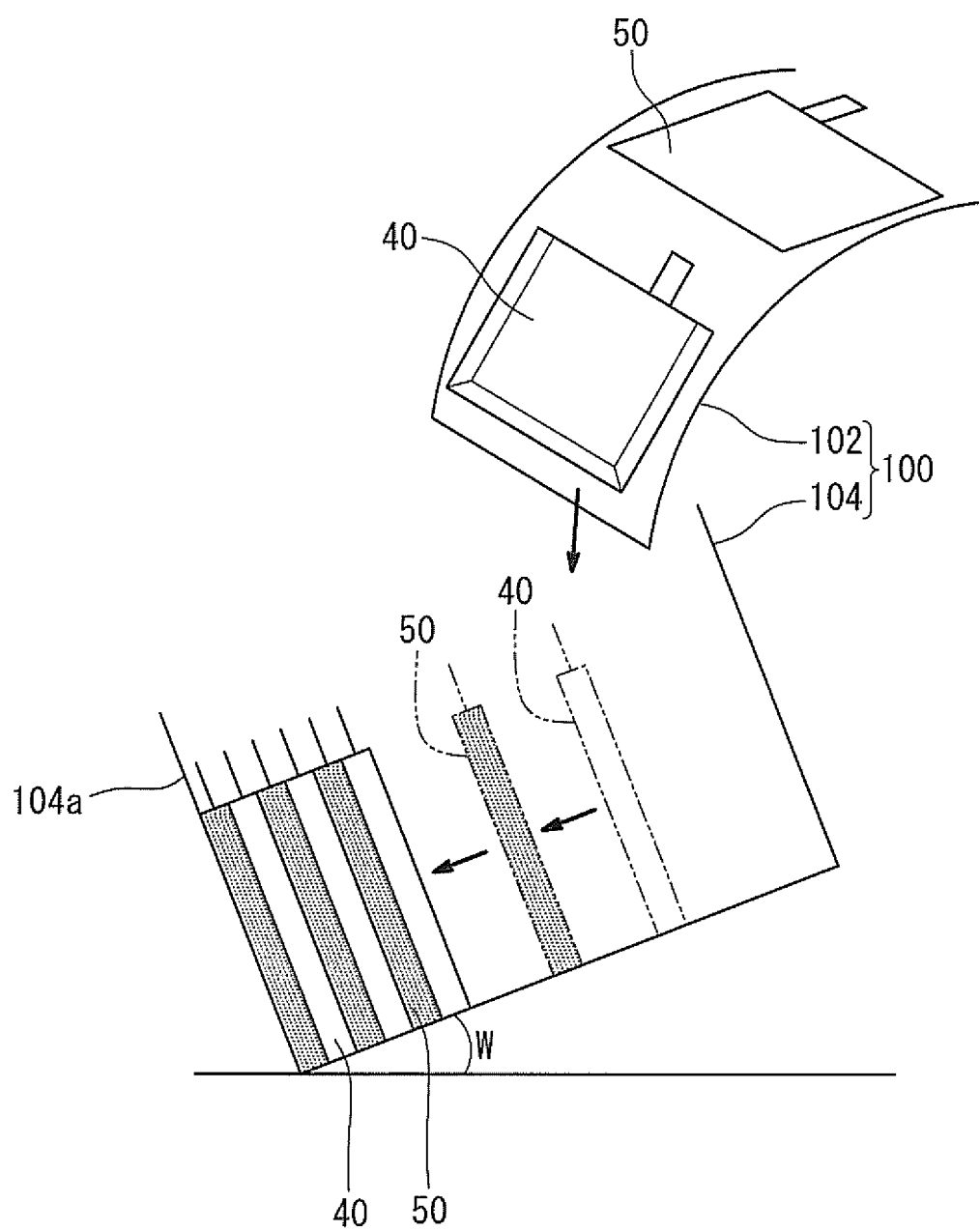
FIG. 14 is a schematic view of a laminating apparatus.

As shown in FIG. 14, in the lamination step S3, the positive electrode plate units 50 and the negative electrode plates 40 are alternately stacked. In the lamination step S3, a lamination device 100 may be used. The lamination device 100 includes, for example, a slide surface 102 and a lamination box 104. The positive electrode plate units 50 and the negative electrode plates 40 are alternately transported from a conveyer (not shown) in succession onto the slide surface 102. Once transported onto the slide surface 102, the positive electrode plate units 50 and the negative electrode plates 40 fall from the slide surface 102 into the lamination box 104. The lamination box 104 is inclined at a predetermined angle W with respect to the horizontal surface. In this way, due to the gravitational force resulting from the incline, the positive electrode units 50 and the negative electrode plates 40 are deposited into the lamination box 104 move to a front surface 104a side of the lamination box 104 so that they can be successively laminated from the front surface 104a side. As a result, an electrode assembly 20 (see FIG. 6) is produced in which the positive electrode plate units 50 and the negative electrode plates 40 are alternately laminated in succession in the rear-to-front direction along the thickness of the plates. The positive electrode plate units 50 and the negative electrode plates 40 are laminated with their respective front surfaces 30a and 40a oriented in the same direction in said rear-to-front direction of the positive electrode plates 30 and the negative electrode plates 40. Therefore, in the electrode assembly 20, the front positive electrode active material layers 34 provided with the positive electrode large tapered portion 34a and the front negative electrode active material layers 44 provided with the negative electrode large tapered portion 44a are also consequently oriented in the same direction.

Figure 15:
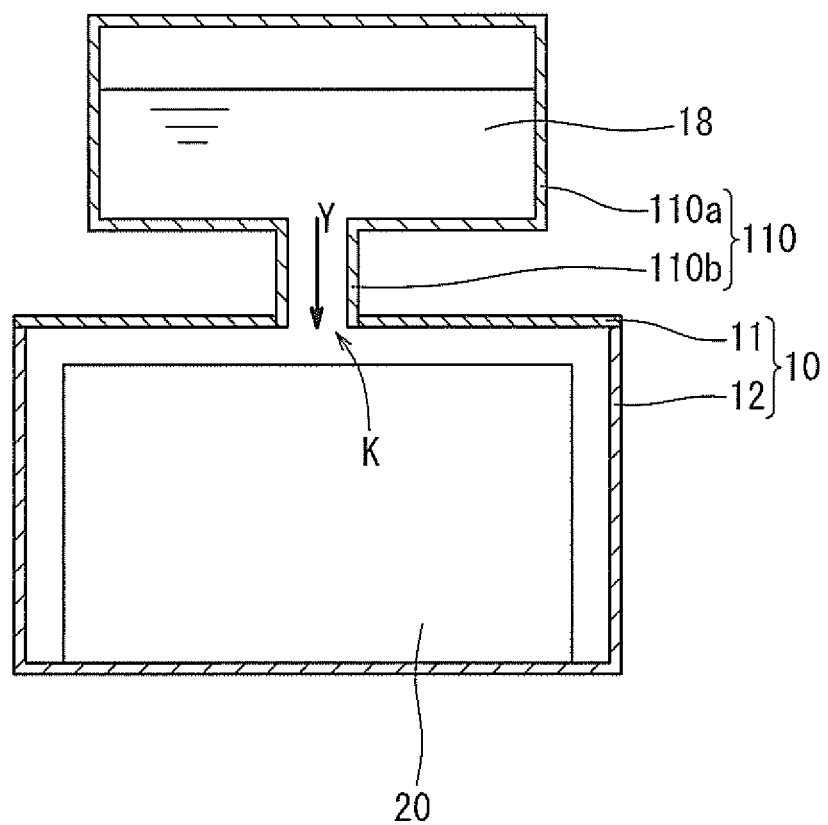
FIG. 15 is a schematic cross-sectional view showing how electrolyte solution is filled in the electric storage device.

Subsequently, the electrode assembly 20 is transferred to an in-case sealing step. As shown in FIG. 15, in the in-case sealing step, the electrode assembly 20 is sealed in the case 10. Further, the case 10 communicates with a tank 110 through an injection port K (not shown in FIG. 1). The tank 110 includes a tank main body 110a filled with electrolyte solution 18 and a communication passage 110b configured to facilitate communication between the tank main body 110a and the case 10. The electrolyte solution 18 flows through the communication passage 110b from the tank main body 110a into the case 10 as indicated by an arrow Y shown in FIG. 15. The electrolyte solution 18 is then filled in the case 10. Subsequently, this configuration is held until the electrolyte solution 18 impregnates each of the active material layers 34 and 36, 44 and 46 (see FIG. 6). After the electrolyte solution 18 has impregnated each of the material layers 34 and 36, 44 and 46, the injection port K is then sealed, thereby completing the construction of the electric storage device 1 (see FIG. 1).

In the in-case sealing step described above, conventionally, a very long time was required until the electrolyte solution is impregnated each of the active material layers. On the contrary, as shown in FIG. 6, due to the positive electrode large tapered portions 34a, which are inclined toward the inner side of the positive electrode plate 30, such a long time is not required. The large tapered portions 34a, provided at the outer edge of the front positive electrode active material layer 34 of the electrode assembly 20, promotes the supply of the electrode solution 18 toward the inner side of the positive electrode plate 30 in the front positive electrode active material layer 34, due to their inclination. As a result, the impregnation efficiency of the electrolyte solution 18 is enhanced in the front positive electrode active material layer 34. Similarly, the supply of the electrolyte solution 18 in the rear negative electrode active material layer 46 opposing to the front positive electrode active material layer 34 with the separator 54 interposed therebetween is also enhanced. This may also improve the impregnation efficiency of the electrolyte solution 18 in the rear negative electrode active material layer 46.

As shown in FIG. 6, the negative electrode large tapered portions 44a, which are inclined toward the inner side of the negative electrode plate 40, are provided at an incline at the outer edge of the front negative electrode active material layer 44 of the electrode assembly 20. This promotes the supply of the electrolyte solution 18 toward the inner side of the negative electrode plate 40 in the front negative electrode active material layer 44 due to said incline. As a result, the impregnation efficiency of the electrolyte solution 18 is enhanced in the front negative electrode active material layer 44. Similarly, the supply of the electrolyte solution 18 in the rear positive electrode active material layer 36 opposing to the front negative electrode active material layer 44 with the separator 54 interposed therebetween is also enhanced. This may also improve the impregnation efficiency of the electrolyte solution 18 in the rear positive electrode active material layer 36.

As shown in FIG. 6, the positive electrode plate 30 and the negative electrode plate 40 are laminated with each of the front surfaces 30a and 40a having the positive electrode large tapered portion 34a and the negative electrode large tapered portion 44a oriented in the same direction, respectively. This may position clearances, into which the electrolyte solution 18 can enter, in an evenly distributed manner as compared to the case where, for example, the positive electrode plate 30 and the negative electrode plate 40 are laminated with each of the front surfaces 30a and 40a facing towards each other. Therefore, because of said even distribution of clearances, the uneven impregnation of the electrolyte solution 18 in the laminating direction of the positive electrode plates 30 and negative electrode plates 40, may be prevented in the electrode assembly 20 while the supply of the electrolyte solution 18 in each of the active material layers 34 and 36, 44 and 46 is promoted as described above.

The exemplary embodiments of the present invention have been described above, however, it would be obvious for one skilled in the art that these are susceptible of some replacement, improvement and/or modification without departing from the object of the present invention. Therefore, the exemplary embodiments of the present invention may include any replacement, improvement and/or modification without departing from the gist and object of the attached claims. For example, the exemplary embodiments of the present invention are not limited to the above specific structure, and can be modified as follows.

The positive electrode large tapered portions 34a (see FIG. 4) may be provided at all four edges 38a, 38b, 38c and 38d of the positive electrode plate 30 or may instead be provided at least one side of these four edges 38a, 38b, 38c and 38d. Similarly, the negative electrode large tapered portions 44a (see FIG. 5) may be provided at all four edges 48a, 48b, 48c and 48d of the negative electrode plate 40 or may instead be provided at at least one side of these four edges 48a, 48b, 48c and 48d.

The positive electrode large inclination angle θ1A and the positive electrode small inclination angle θ1B (see FIG. 6) may be set individually for each edge at each of the edges 38a, 38b, 38c, and 38d of the positive electrode plate 30. In this case, the positive electrode large inclination angle θ1A is set larger than the corresponding positive electrode small inclination angle θ1B at each of the corresponding edges 38a, 38b, 38c and 38d of the positive electrode plate 30. Similarly, the negative electrode large inclination angle θ2A and the negative electrode small inclination angle θ2B (see FIG. 6) may be set individually at each of the edges 48a, 48b, 48c and 48d of the negative electrode plate 40. In this case, the negative electrode large inclination angle θ2A is set larger than the corresponding negative electrode small inclination angle θ2B at each of the corresponding edges 48a, 48b, 48c and 48d of the negative electrode plate 40. The magnitude relation (θ1A<θ2A) as described above between the positive electrode large inclination angle θ1A and the negative electrode large inclination angle θ2A is fulfilled at each edge of the positive electrode plate 30 and each corresponding edge of the negative electrode plate 40. Specifically, this magnitude relation is fulfilled at the positive electrode tab edge 38a and the negative electrode tab edge 48a, the positive electrode tab opposing edge 38b and the negative electrode tab opposing edge 48b, the first positive electrode edge 38c and the first negative electrode edge 48d, and at the second positive electrode edge 38d and the second negative electrode edge 48d.

Figure 19:
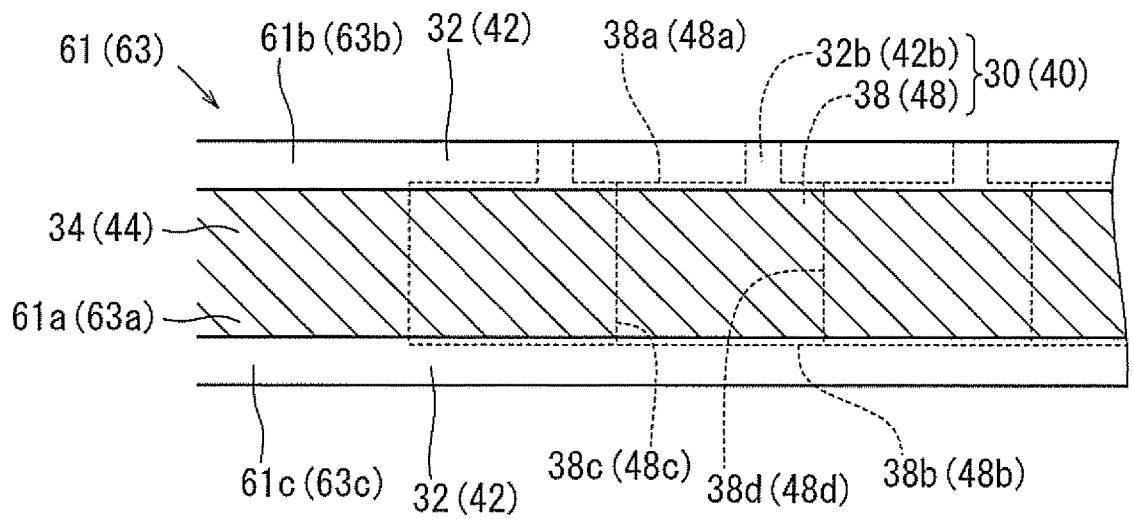
FIG. 19 is a plan view showing another exemplary embodiment of a positive electrode base sheet and a negative electrode base sheet.
Figure 20:
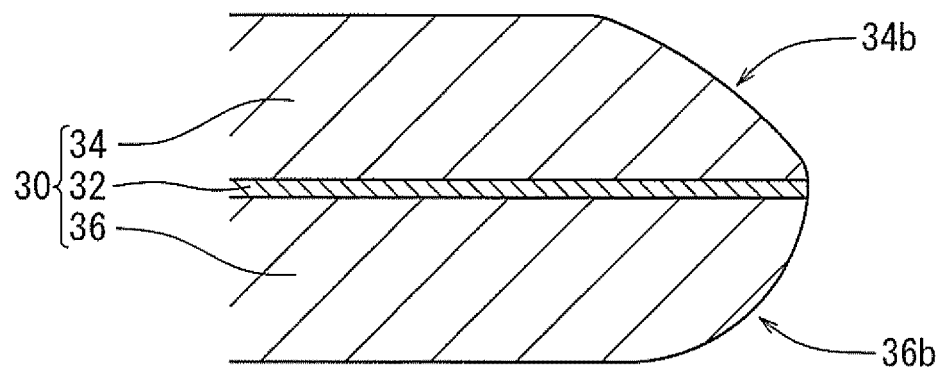
FIG. 20 is a cross-sectional view showing another exemplary embodiment of a positive electrode large tapered portion and a positive electrode small tapered portion.
Figure 21:
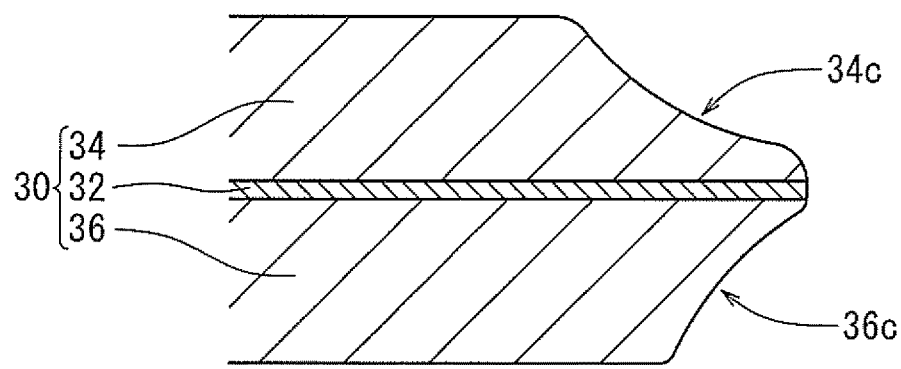
FIG. 21 is a cross-sectional view showing another exemplary embodiment of the positive electrode large tapered portion and the positive electrode small tapered portion.

As shown in FIG. 20, instead of the positive electrode large tapered portion 34a and the positive electrode small tapered portion 36a of the embodiment described above, the positive electrode large tapered portion 34b and the positive electrode small tapered portion 36b may be curved or inclined in a mountain-shaped concave upward and downward curve, respectively. Further alternatively, as shown in FIG. 21, the positive electrode large tapered portion 34c and the positive electrode small tapered portion 36c may be curved or inclined in a valley-shaped upward or downward convex curve, respectively. Similarly, the negative electrode large tapered portion and the negative electrode small tapered portion may also be analogously curved or inclined in a concave or convex curve shape. The repeated description shall be omitted by assigning the same reference numerals as in FIGS. 1 to 15 to the parts in FIGS. 16 to 21 that have the same or substantially the same construction and function as those parts in FIGS. 1 to 15.

Figure 16:
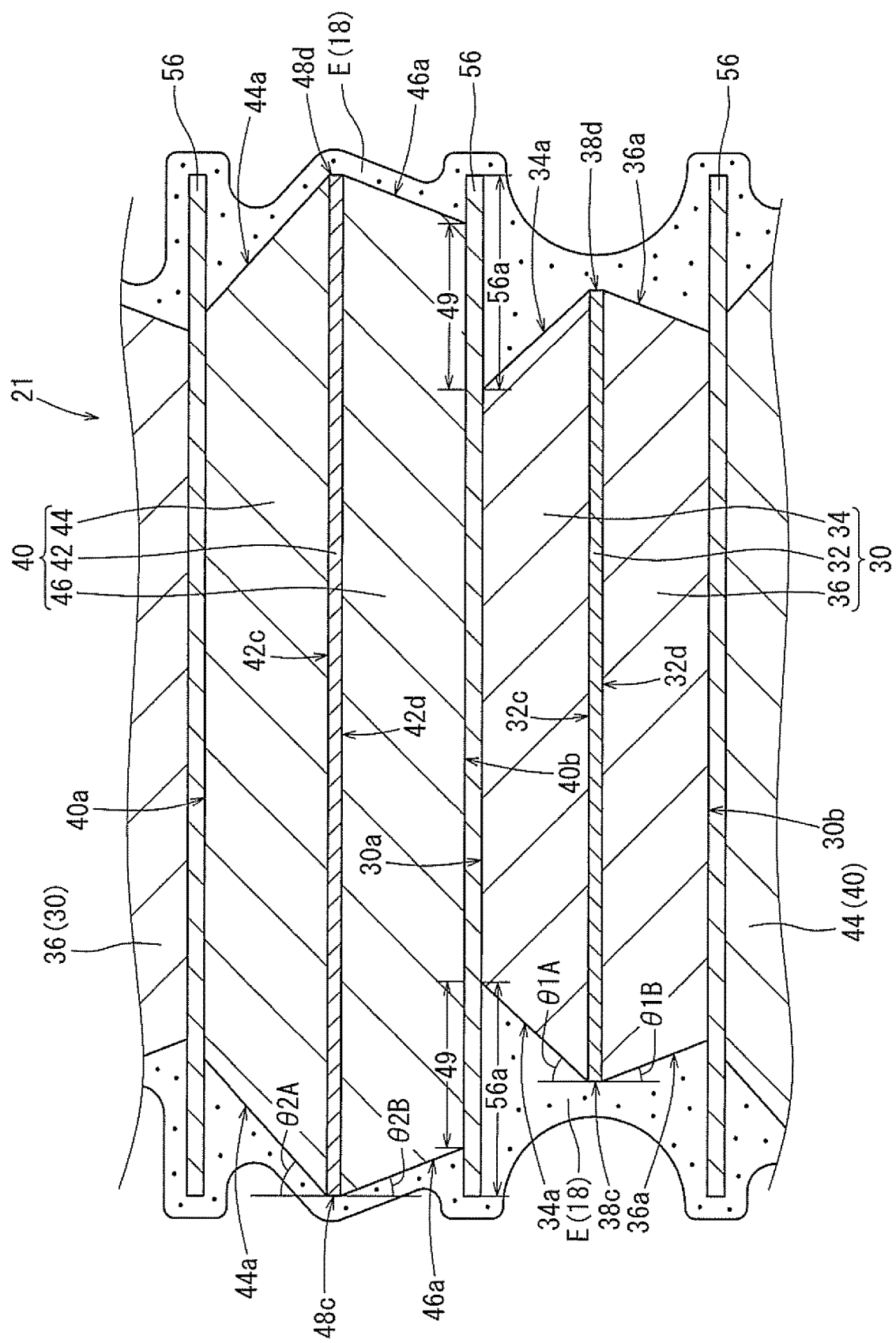
FIG. 16 is a cross-sectional view showing another exemplary embodiment of the electrode assembly.

The electrode assembly 21 shown in FIG. 16 may be adopted as the electrode assembly. In the electrode assembly 21, the positive electrode plate 30 and the negative electrode plate 40 are both respectively exposed without being enveloped with the separator. The separator 56 as a one sheet shape is placed between the positive electrode plate 30 and the negative electrode plate 40. Due to the lack of being enveloped by a separator, the positive electrode large inclination angle θ1A is smaller than the negative electrode large inclination angle θ2A.

As shown in FIG. 16, the surface area of the positive electrode plate 30 is smaller than that of the negative electrode plate 40. Therefore, the differential is manifested as a projecting part 49 of the negative electrode plate 40 that projects from outward from the outer edge of positive electrode plate 30. A separator projecting part 56a covering the projecting part 49 becomes a part of a plane, which due to the projecting part 56a retains the built up electrolyte E formed around the outer edge of the positive electrode plate 30, to encourage the formation of the built-up electrolyte. Therefore, with a greater length of projecting portion 56a relative to positive electrode plate 30 as compared to negative electrode plate 40, the built up electrolyte E formed along the positive electrode large tapered portion 34a tends to be more stably retained compared to the built up electrolyte E formed along the negative electrode large tapered portion 44a. It is however possible to equalize an amount of the built up electrolyte E, which is formed at respective positive electrode large tapered portion 34a and the negative electrode large tapered portion 44a, by setting the inclination angle of the positive electrode large tapered portion 34a smaller than the inclination angle of the negative electrode large tapered portion 44a. Uneven impregnation of the electrolyte solution 18 in the laminating direction can also be suppressed in the electrode assembly 21 when the positive electrode plate 30 and the negative electrode plate 40 are laminated while the front surface 30a of the positive electrode plate 30 provided with the positive electrode large tapered portion 34a and the front surface 40a of the negative electrode plate 40 provided with the negative electrode large tapered portion 44a are oriented in the same direction in the rear-to-front directional axis along the thickness of the positive electrode plate 30 and negative electrode plate 40.

Figure 17:
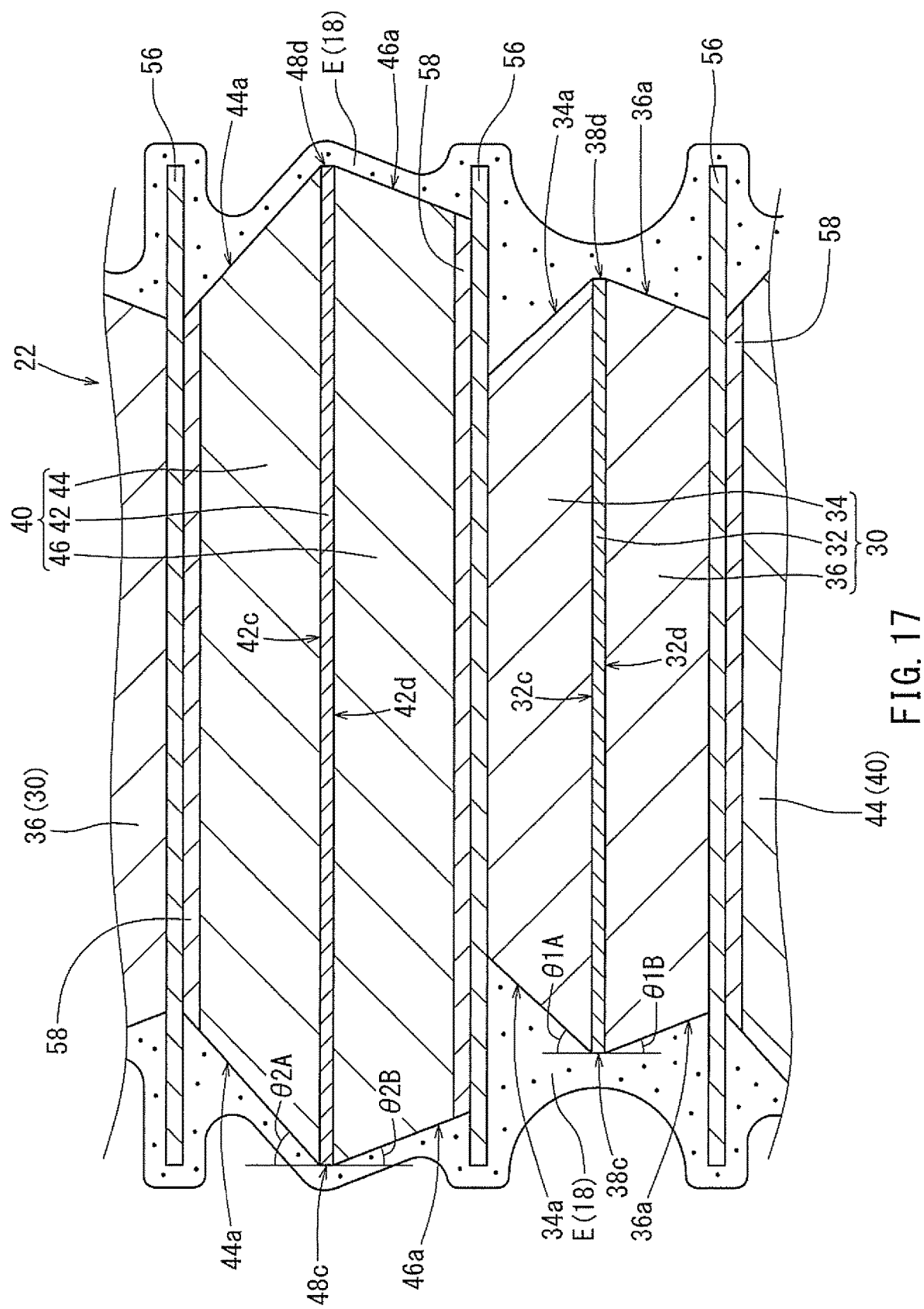
FIG. 17 is a cross-sectional view showing another exemplary embodiment of the electrode assembly.

The electrode assembly 22 shown in FIG. 17 may be adopted as the electrode assembly. According to the electrode assembly 22, the front negative electrode active material layer 44 and the rear negative electrode active material layer 46 are respectively covered with a heat-resistant layer 58. The heat-resistant layer 58 is formed over the entire contiguous surface area at the top of negative electrode active material layer 44, and at the bottom of negative electrode active material layer 46, as shown in FIG. 17. The heat-resistant layer 58 may be made of ceramic. The heat-resistant layer 58 may effectively prevent short-circuiting between the positive electrode plate 30 and negative electrode plate 40 caused by, for example, high heat. The negative electrode large tapered portion 44a is provided to extend linearly from the negative electrode metal foil 42 to the heat-resistant layer 58 at the top of the front negative electrode active material layer 44 at an incline. Further, the front negative electrode active material layer 44 is exposed at the negative electrode large tapered portion 44a (i.e. it is not covered by the heat-resistant layer at 44a). Therefore, since the supply of the electrolyte solution 18 from the built up electrolyte E, which is formed along the negative electrode large tapered portion 44a, to the front negative electrode active material layer 44 is promoted, the impregnation speed of the electrolyte solution 18 into the front negative electrode active material layer 44 is accelerated. The negative electrode small tapered portion 46a is provided to extend linearly from the negative electrode metal foil 42 to the heat-resistant layer 58 at the bottom of the rear negative electrode active material layer 46. Further, the rear negative electrode active material layer 46 is exposed at the negative electrode small tapered portion 46a.

The electrode assembly may include the positive electrode plate unit 50 (see FIG. 2) and the negative electrode plate 40 (see FIG. 17) having the heat-resistant layer 58 on both front (at the top) and rear sides (at the bottom), and may be configured such that these positive electrode plate units 50 and the negative electrode plates 40 are alternately laminated.

Figure 18:
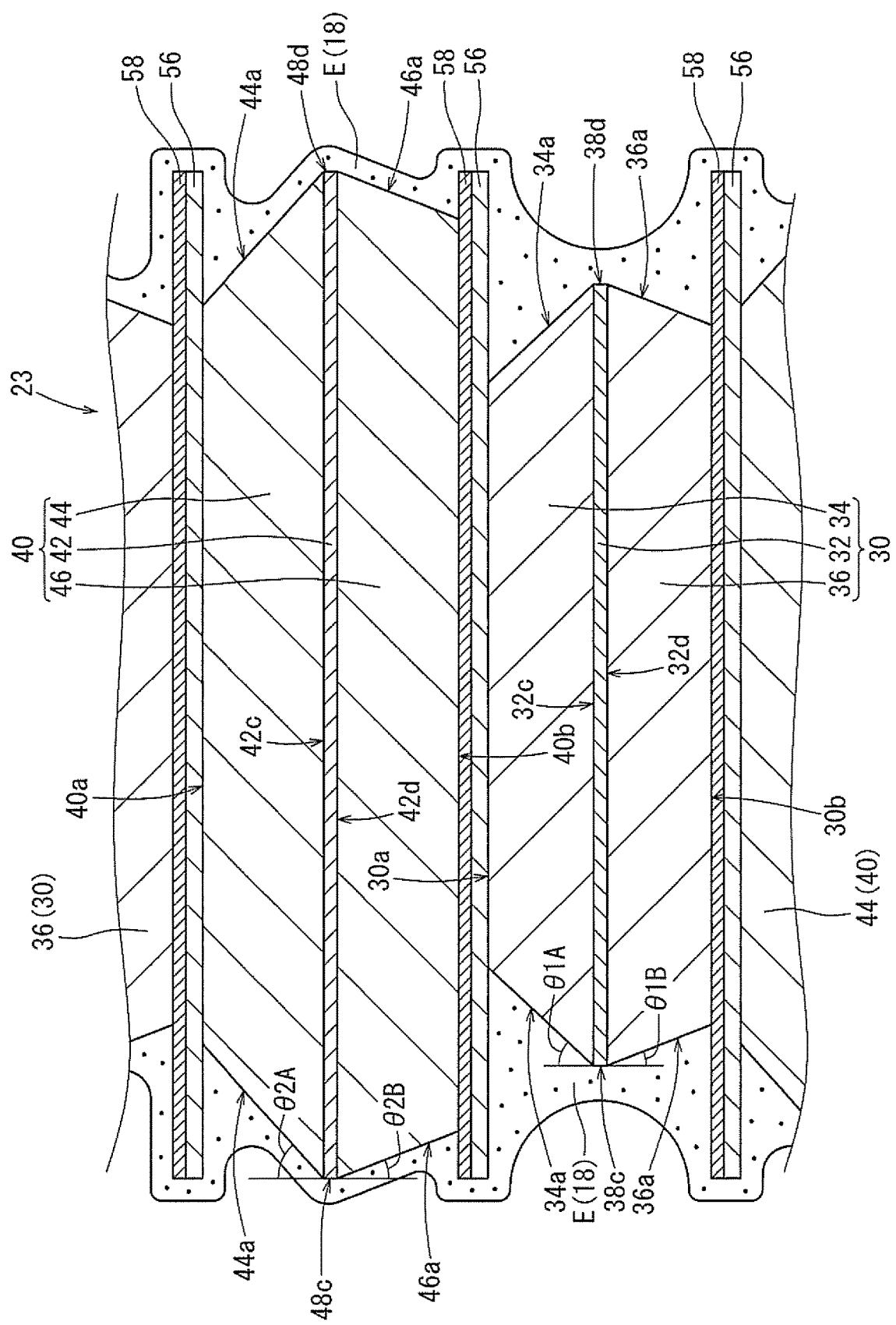
FIG. 18 is a cross-sectional view showing another exemplary embodiment of the electrode assembly.

The heat-resistant layer(s) 58 may be formed on the separator(s) as the electrode assembly 23 shown in FIG. 18. The heat-resistant layer 58 is formed over the entire contiguous surface area of the plane of the separator 56 on the side oppositely facing the negative electrode plate 40. With this configuration, similar to the electrode assembly 22 shown in FIG. 17, the heat-resistant layer 58 may effectively prevent short-circuiting between the positive electrode plate 30 and negative electrode plate 40 caused by, for example, high heat. Further, the built up electrolyte E may be formed along the positive electrode large tapered portion 34a and the negative electrode large tapered portion 44a. The built up electrolyte E may promote the supply of the electrolyte solution 18 to the front positive electrode active material layer 34 and the front negative electrode active material layer 44. This promotion of built up electrolyte E may accelerate the impregnation speed of the built-up electrolyte 18 to the front positive electrode active material layer 34 and the front negative electrode active material layer 44.

Instead of the configuration described above, the electrolyte assembly may instead include the positive electrode plate 30 not enveloped with the separator, and where the negative electrode plate 40 is enveloped with the separator. The negative electrode plate 40 may be, for example, enveloped with the separator having a larger area than that of the negative electrode plate 40 thereby comprising the negative electrode plate unit (electrode plate unit). The positive electrode plate 30 and the negative electrode plate unit are alternately laminated. In this case, the negative electrode large inclination angle is set to be smaller than the positive electrode large inclination angle.

As shown in FIG. 19, the positive electrode base sheet 61 may be configured such that the width (height as shown in FIG. 19) of the positive electrode base sheet 61 substantially coincides with the length from the positive electrode tab opposing edge 38b to the positive electrode tab edge 38a. In this case, only one positive electrode plate 30 is cut out in the width direction of the positive electrode base sheet 61 as indicated by the dotted lines in FIG. 19. Similarly, the negative electrode base sheet 63 may be configured such that the width in the active material layer formation region 63a substantially coincides the length from the negative electrode tab opposing edge 48b to the negative electrode tab edge 48a. Only one negative electrode plate 40 is cut out in the width direction of the negative electrode base sheet 63.

The coating-and-drying apparatus 70 and the laser processing apparatus 80 shall not be limited to those with the configuration described in the above exemplary embodiments but may be any of those with the configuration that may similarly function as those of the above exemplary embodiments. The laser apparatus may be, for example, a scanner-type that can change the three dimensional irradiation position of the laser beam with a mirror. The laser beam need not be irradiated in a direction such that its optical axis extends perpendicular to the positive electrode base sheet 61 and the negative electrode base sheet 63. In addition, instead of cutting when stopped, the laser apparatus may irradiate the positive electrode base sheet 61 and the negative electrode base sheet 63 with the laser beam so as to cut the positive electrode base sheet 61 and the negative electrode base sheet 63 during conveying movement of the positive electrode base sheet 61 and the negative electrode base sheet 63.

The invention claimed is:

1. An electrode assembly comprising:
positive electrode plates, each of which includes a front positive electrode active material layer provided on a front surface of a positive electrode metal foil and a rear positive electrode active material layer provided on a rear surface of the positive electrode metal foil;
negative electrode plates, each of which includes a front negative electrode active material layer provided on a front surface of a negative electrode metal foil and a rear negative electrode active material layer provided on a rear surface of the negative electrode metal foil; and separators, each of which is interposed between each of the positive electrode plates and each of the negative electrode plates, wherein the front positive electrode active material layer has a positive electrode large tapered portion that extends at an incline from one edge of the front surface of the positive electrode metal foil to an inner side of the positive electrode plate at a positive electrode large inclination angle, wherein the rear positive electrode active material layer has a positive electrode small tapered portion that extends at an incline from one edge of the rear surface of the positive electrode metal foil to the inner side of the positive electrode plate at a positive electrode small inclination angle, which is smaller than the positive electrode large inclination angle, wherein the front negative electrode active material layer has a negative electrode large tapered portion that at an incline from one edge of the front surface of the negative electrode metal foil to an inner side of the negative electrode plate at a negative electrode large inclination angle, wherein the rear negative electrode active material layer has a negative electrode small tapered portion that extends at an incline from one edge of the rear surface of the negative electrode metal foil to the inner side of the negative electrode plate at a negative electrode small inclination angle, which is smaller than the negative electrode large inclination angle, wherein the positive electrode plates and the negative electrode plates are alternately laminated with the separator or separators interposed therebetween such that the front surface of the positive electrode plates having the positive electrode large tapered portion and the front surface of the negative electrode plates having the negative electrode large tapered portion are oriented in the same direction in a rear-to-front directional axis along a thickness of the positive electrode plates and the negative electrode plates, wherein one of the positive electrode plates or the negative electrode plates constitutes an electrode plate unit enveloped by a separator forming a bag shape with the separator having a larger surface area than that of the one of the positive electrodes or negative electrode plates, wherein the positive electrode large inclination angle is set to be smaller than the negative electrode large inclination angle in the case where one of the positive electrode plates constitutes the electrode plate unit, and wherein the negative electrode large inclination angle is set to be smaller than the positive electrode large inclination angle in the case where one of the negative electrode plates constitutes the electrode plate unit.

2. The electrode assembly of claim 1 wherein the separator is made in one piece, wherein the surface area of the positive electrode metal foil is smaller than the surface area of the negative electrode metal foil, and wherein the positive electrode large inclination angle is set to be smaller than the negative electrode large inclination angle.

3. The electrode assembly of claim 1, wherein each of the front negative electrode active material layers and each of the rear negative electrode active material layers is covered with a heat-resistant layer, wherein the negative electrode large tapered portion extends linearly from the front negative electrode active material layer to the heat-resistant layer, and wherein the front negative electrode active material layer is exposed and not covered by the heat-resistant layer at the negative electrode large tapered portion.

4. The electrode assembly of claim 1, wherein the separator is made in one piece as a flat sheet with a surface area larger than or equal to that of both the positive and negative electrode plates, wherein the surface area of the positive electrode metal foil is smaller than the surface area of the negative electrode metal foil, and wherein the positive electrode large inclination angle is set to be smaller than the negative electrode large inclination angle.

5. A method for manufacturing an electrode assembly including positive electrode plates, negative electrode plates and separators interposed between the positive electrode plates and negative electrode plates, wherein each of the positive electrode plates includes a front positive electrode active material layer and a rear positive electrode active material layer provided respectively on a front surface or rear surface of a positive electrode metal foil, wherein each of the negative electrode plates includes a front negative electrode active material layer and a rear negative electrode active material layer provided respectively on a front surface or rear surface of a negative electrode metal foil, the method comprising steps of:

preparing a positive electrode base sheet and a negative electrode base sheet, wherein the positive electrode base sheet is coated with the front positive electrode active material layer and the rear positive electrode active material layer on each of the front and rear surfaces, respectively, of a strip-shaped positive electrode metal foil, wherein the negative electrode base sheet is coated with the front negative electrode active material layer and the rear negative electrode active material layer on each of the front and rear surfaces, respectively, of a strip-shaped negative electrode metal foil;

irradiating the positive electrode base sheet with a laser beam from the front positive electrode active material layer through to the rear positive electrode active material layer to cut out the positive electrode plate from the positive electrode base sheet and to form a positive electrode large tapered portion which extends at an incline from one edge of a front surface of the positive electrode metal foil of the positive electrode plate to an inner side of the positive electrode plate at a positive electrode large inclination angle on the front positive active material layer, and further to form a positive electrode small tapered portion on the rear positive electrode active material layer, which extends at an incline from one edge of a rear surface of the positive electrode metal foil of the positive electrode plate to an inner side of the positive electrode plate at a positive electrode small inclination angle, which is smaller than the positive electrode large inclination angle;

irradiating the negative electrode base sheet with a laser beam from the front negative electrode active material layer through to the rear negative electrode active material layer to cut out the negative electrode plate from the negative electrode base sheet and to form a negative electrode large tapered portion which extends at an incline from one edge of a front surface of the negative electrode metal foil of the negative electrode plate to an inner side of the negative electrode plate at a negative electrode large inclination angle on the front negative active layer, and further to form a negative electrode small tapered portion on the rear negative electrode active material layer, which extends at an incline from one edge of a rear surface of the negative electrode metal foil of the negative electrode plate to an inner side of the negative electrode plate at a negative electrode small inclination angle, which is smaller than the negative electrode large inclination angle;

laminating the positive electrode plates and the negative electrode plates while front surfaces of the positive electrode plates provided with the positive electrode large tapered portion and front surfaces of the negative electrode plate provided with the negative electrode large tapered portion are both oriented in the same direction in a rear-to-front directional axis along a thickness of the positive electrode plate and negative electrode plate, wherein when irradiating the positive electrode base sheet with the laser beam, the laser beam is focused on a focal point formed at a predetermined position lying on the positive electrode base sheet, wherein an optical axis of the laser beam is perpendicular to said positive electrode base sheet such that the positive electrode large tapered portion and the positive electrode small tapered portion are simultaneously formed by the laser beam, and when irradiating the negative electrode base sheet with the laser beam, the laser beam is focused on a focal point formed at a predetermined position lying on the negative electrode base sheet, wherein an optical axis of the laser beam is perpendicular to said negative electrode base sheet such that the negative electrode large tapered portion and the negative electrode small tapered portion are simultaneously formed by the laser beam.

6. The method of claim 5, wherein the positive and negative electrode base sheets are irradiated by the laser beam while the positive and negative electrode base sheets are in motion, being conveyed on a conveyor belt.

7. A method for manufacturing an electrode assembly including positive electrode plates, negative electrode plates and separators interposed between the positive electrode plates and negative electrode plates, wherein each of the positive electrode plates includes a front positive electrode active material layer and a rear positive electrode active material layer provided respectively on a front surface or rear surface of a positive electrode metal foil, wherein each of the negative electrode plates includes a front negative electrode active material layer and a rear negative electrode active material layer provided respectively on a front surface or rear surface of a negative electrode metal foil, where the positive and negative electrode plates may be prepared in parallel, the method comprising steps of:

preparing a positive electrode base sheet and a negative electrode base sheet, wherein the positive electrode base sheet is coated with the front positive electrode active material layer and the rear positive electrode active material layer on each of the front and rear surfaces, respectively, of a strip-shaped positive electrode metal foil, wherein the negative electrode base sheet is coated with the front negative electrode active material layer and the rear negative electrode active material layer on each of the front and rear surfaces, respectively, of a strip-shaped negative electrode metal foil, where both positive and negative electrode metal foils are coated by using a supply roller supplying the metal foil where it is coated on both the front and rear sides by a coating apparatus, where it is dried and pressed after being coated;

irradiating the positive electrode base sheet with a laser beam from the front positive electrode active material layer through to the rear positive electrode active material layer to cut out the positive electrode plate from the positive electrode base sheet and to form a positive electrode large tapered portion which extends at an incline from one edge of a front surface of the positive electrode metal foil of the positive electrode plate to an inner side of the positive electrode plate at a positive electrode large inclination angle on the front positive active material layer, and further to form a positive electrode small tapered portion on the rear positive electrode active material layer, which is extends at an incline from one edge of a rear surface of the positive electrode metal foil of the positive electrode plate to an inner side of the positive electrode plate at a positive electrode small inclination angle which is smaller than the positive electrode large inclination angle;

irradiating the negative electrode base sheet with a laser beam from the front negative electrode active material layer through to the rear negative electrode active material layer to cut out the negative electrode plate from the negative electrode base sheet and to form a negative electrode large tapered portion which extends at an incline from one edge of a front surface of the negative electrode metal foil of the negative electrode plate to an inner side of the negative electrode plate at a negative electrode large inclination angle on the front negative active layer, and further to form a negative electrode small tapered portion on the rear negative electrode active material layer, which extends at an incline from one edge of a rear surface of the negative electrode metal foil of the negative electrode plate to an inner side of the negative electrode plate at a negative electrode small inclination angle, which is smaller than the negative electrode large inclination angle;

laminating the positive electrode plates and the negative electrode plates while front surfaces of the positive electrode plates provided with the positive electrode large tapered portion and front surfaces of the negative electrode plate provided with the negative electrode large tapered portion are both oriented in the same direction in a rear-to-front directional axis along a thickness of the positive electrode plate and negative electrode plate; and collecting each electrode plate that is cut out by the laser beam by using a collection device, after irradiation of the positive and negative electrode base sheets with the laser beam and prior to lamination, wherein a suction hand is used to suction each positive and negative electrode plate upward from a conveyor belt, and then drop said plate into a respective collection box.

8. The method of claim 7, wherein from the collection box, the positive and negative electrode plates are eventually deposited in an alternating order onto a slide surface, which in turn deposits the positive and negative electrode plates in the alternating order into a lamination box.

9. The method of claim 8, wherein the lamination box is inclined at a predetermined angle with respect to the horizontal surface, wherein due to gravitational force resulting from the incline, the positive and negative electrode plates are alternately stacked at the front of said box, where they are laminated from their front surface side in succession.

10. A method for manufacturing an electrode assembly including positive electrode plates, negative electrode plates and separators interposed between the positive electrode plates and negative electrode plates, wherein each of the positive electrode plates includes a front positive electrode active material layer and a rear positive electrode active material layer provided respectively on a front surface or rear surface of a positive electrode metal foil, wherein each of the negative electrode plates includes a front negative electrode active material layer and a rear negative electrode active material layer provided respectively on a front surface or rear surface of a negative electrode metal foil, the method comprising steps of:

preparing a positive electrode base sheet and a negative electrode base sheet, wherein the positive electrode base sheet is coated with the front positive electrode active material layer and the rear positive electrode active material layer on each of the front and rear surfaces, respectively, of a strip-shaped positive electrode metal foil, wherein the negative electrode base sheet is coated with the front negative electrode active material layer and the rear negative electrode active material layer on each of the front and rear surfaces, respectively, of a strip-shaped negative electrode metal foil;

irradiating the positive electrode base sheet with a laser beam from the front positive electrode active material layer through to the rear positive electrode active material layer to cut out the positive electrode plate from the positive electrode base sheet and to form a positive electrode large tapered portion which extends at an incline from one edge of a front surface of the positive electrode metal foil of the positive electrode plate to an inner side of the positive electrode plate at a positive electrode large inclination angle on the front positive active material layer, and further to form a positive electrode small tapered portion on the rear positive electrode active material layer, which is extends at an incline from one edge of a rear surface of the positive electrode metal foil of the positive electrode plate to an inner side of the positive electrode plate at a positive electrode small inclination angle, which is smaller than the positive electrode large inclination angle;

irradiating the negative electrode base sheet with a laser beam from the front negative electrode active material layer through to the rear negative electrode active material layer to cut out the negative electrode plate from the negative electrode base sheet and to form a negative electrode large tapered portion which extends at an incline from one edge of a front surface of the negative electrode metal foil of the negative electrode plate to an inner side of the negative electrode plate at a negative electrode large inclination angle on the front negative active layer, and further to form a negative electrode small tapered portion on the rear negative electrode active material layer, which extends at an incline from one edge of a rear surface of the negative electrode metal foil of the negative electrode plate to an inner side of the negative electrode plate at a negative electrode small inclination angle which is smaller than the negative electrode large inclination angle; and laminating the positive electrode plates and the negative electrode plates while front surfaces of the positive electrode plates provided with the positive electrode large tapered portion and front surfaces of the negative electrode plate provided with the negative electrode large tapered portion are both oriented in the same direction in a rear-to-front directional axis along a thickness of the positive electrode plate and negative electrode plate, wherein the laser beam utilizes a focusing lens, an assist gas feeder, and a laser beam oscillator.

* * * * *